United States Patent [19]

Ohtake

[11] Patent Number: 5,487,180
[45] Date of Patent: Jan. 23, 1996

[54] METHOD OF DETERMINING INITIAL TRANSMISSION POWER

[75] Inventor: Koji Ohtake, Kawasaki, Japan

[73] Assignee: Fujitsu Limited, Kanagawa, Japan

[21] Appl. No.: 215,093

[22] Filed: Mar. 17, 1994

[30] Foreign Application Priority Data

Sep. 20, 1993 [JP] Japan .................................. 5-256382

[51] Int. Cl.$^6$ .................................................. H04B 1/40
[52] U.S. Cl. ............................................. 455/54.1; 455/69
[58] Field of Search ........................ 455/68, 69, 54.1, 455/54.2, 56.1, 63, 70; 379/59, 60

[56] References Cited

U.S. PATENT DOCUMENTS

| | | | |
|---|---|---|---|
| 4,435,840 | 3/1984 | Kojima et al. | 379/60 |
| 4,613,990 | 9/1986 | Halpern | 455/33.2 |
| 5,003,619 | 3/1991 | Morris et al. | 455/69 |
| 5,056,109 | 10/1991 | Gilhousen et al. | 455/54.1 |
| 5,128,965 | 7/1992 | Henriksson | 455/69 |
| 5,241,691 | 8/1993 | Owen | 455/54.2 |
| 5,265,119 | 11/1993 | Gilhousen et al. | 455/54.1 |
| 5,267,262 | 11/1993 | Wheatley, III | 455/54.1 |
| 5,276,908 | 1/1994 | Kochgoli et al. | 455/54.1 |
| 5,293,639 | 3/1994 | Wilson et al. | 455/69 |
| 5,319,795 | 6/1994 | Hamabe et al. | 455/54.2 |

*Primary Examiner*—Edward F. Urban

[57] ABSTRACT

A method for determining an initial transmission power in a mobile communication system having a base station and at least one mobile station includes measuring at the mobile station, a reception level of a control channel leading from the base station to the mobile station, and determining an initial transmission power value of a talk channel leading from the base station to the mobile station, based on the reception level measured at the mobile station.

8 Claims, 30 Drawing Sheets

FIG.3 (CONTINUED FROM FIG.2)

FIG.6 (CONTINUED FROM FIG. 5)

FIG.8

| No. | ITEM | NOTE |
|---|---|---|
| 1 | MESSAGE TYPE | |
| 2 | MOBILE STATION TYPE | |
| 3 | RECEPTION LEVEL | OWN ZONE RECEPTION LEVEL |
| 4 | ZONE SELECTION NUMBER(N) | 0~20 |
| 5 | CHANNEL NUMBER | PERIPHERAL ZONE MAXIMUM RECEPTION LEVEL |
| 6 | RECEPTION LEVEL | PERIPHERAL ZONE MAXIMUM RECEPTION LEVEL |
| 7 | CHANNEL NUMBER | PERIPHERAL ZONE 2ND LARGEST RECEPTION LEVEL |
| 8 | RECEPTION LEVEL | PERIPHERAL ZONE 2ND LARGEST RECEPTION LEVEL |
| ~ | ~ | ~ |
| 9 | CHANNEL NUMBER | PERIPHERAL ZONE NTH LARGEST RECEPTION LEVEL |
| 10 | RECEPTION LEVEL | PERIPHERAL ZONE NTH LARGEST RECEPTION LEVEL |

RCR STANDARD

FIG.9

| BITS | | | | | | | |
|---|---|---|---|---|---|---|---|
| 8 | 7 | 6 | 5 | 4 | 3 | 2 | 1 |
| MOBILE STATION TYPE | | MAXIMUM TRANSMISSION POWER | | | RADIO INTERVAL TRANSMISSION RATE | | |
| MOBILE STATION EV | | | *1 | | STANDARD SECRET VERSION | RESERVE | |
| RESERVE | | DEFINITION REGION PECULIAR TO OPERATOR | | | | | |

*1 VOX ENABLE / DISABLE

MAXIMUM TRANSMISSION POWER (RCR STANDARD)

| BITS | | | MAXIMUM TRANSMISSION POWER | NOTE |
|---|---|---|---|---|
| 6 | 5 | 4 | | |
| 0 | 0 | 0 | 3.0W | 3.0W MOBILE STATION |
| 1 | 1 | 1 | 2.0W | 2.0W MOBILE STATION |
| 1 | 1 | 0 | 2.0W-4dB | 0.8W MOBILE STATION |
| 1 | 0 | 1 | 2.0W-8dB | 0.3W MOBILE STATION |
| OTHERS | | | NOTE | |

FIG.10

| No. | ITEM | NOTE |
|---|---|---|
| 1 | MESSAGE TYPE | |
| 2 | FREQUENCY CODE | |
| 3 | SLOT NUMBER | |
| 4 | COLOR CODE | |
| 5 | MOBILE STATION TRANSMISSION POWER DESIGNATION | |
| 6 | CHANNEL INFORMATION | |

RCR STANDARD

MOBILE STATION TRANSMISSION POWER DESIGNATION

| BITS | | | | | | | |
|---|---|---|---|---|---|---|---|
| 8 | 7 | 6 | 5 | 4 | 3 | 2 | 1 |
| **1 | INITIAL TRANSMISSION POWER | | | MAXIMUM TRANSMISSION POWER | | | |

FIG.11

| No. | ITEM | NOTE |
|---|---|---|
| 1 | MESSAGE TYPE | |
| 2 | CALLED IDENTIFICATION NUMBER | |
| 3 | MOBILE STATION TYPE | |
| 4 | RECEPTION LEVEL | OWN ZONE RECEPTION LEVEL |
| 5 | ZONE SELECTION NUMBER(N) | 0~20 |
| 6 | CHANNEL NUMBER | PERIPHERAL ZONE MAXIMUM RECEPTION LEVEL |
| 7 | RECEPTION LEVEL | PERIPHERAL ZONE MAXIMUM RECEPTION LEVEL |
| 8 | CHANNEL NUMBER | PERIPHERAL ZONE 2ND LARGEST RECEPTION LEVEL |
| 9 | RECEPTION LEVEL | PERIPHERAL ZONE 2ND LARGEST RECEPTION LEVEL |
| 10 | CHANNEL NUMBER | PERIPHERAL ZONE NTH LARGEST RECEPTION LEVEL |
| 11 | RECEPTION LEVEL | PERIPHERAL ZONE NTH LARGEST RECEPTION LEVEL |

RCR STANDARD (CONTINUED TO FIG.14)

FIG.14 (CONTINUED FROM FIG.13)

FIG. 18 (CONTINUED FROM FIG. 17)

FIG.20

| NO. | LEVEL DIFFERENCE VALUE | BIT PATTERN | | | | NOTE |
|---|---|---|---|---|---|---|
| | | 4 | 3 | 2 | 1 | |
| 1 | 0dB ~ 4dB | 0 | 0 | 0 | 0 | |
| 2 | -4dB ~ 0dB | 0 | 0 | 0 | 1 | |
| 3 | 4dB ~ 8dB | 0 | 0 | 1 | 0 | |
| 4 | -8dB ~ -4dB | 0 | 0 | 1 | 1 | |
| 5 | 8dB ~ 12dB | 0 | 1 | 0 | 0 | |
| 6 | -12dB ~ -8dB | 0 | 1 | 0 | 1 | |
| 7 | 12dB ~ 16dB | 0 | 1 | 1 | 0 | |
| 8 | -16dB ~ -12dB | 0 | 1 | 1 | 1 | |
| 9 | 16dB ~ 20dB | 1 | 0 | 0 | 0 | |
| 10 | -20dB ~ -16dB | 1 | 0 | 0 | 1 | |
| 11 | 20dB ~ 24dB | 1 | 0 | 1 | 0 | |
| 12 | -24dB ~ -20dB | 1 | 0 | 1 | 1 | |
| 13 | 24dB ~ 28dB | 1 | 1 | 0 | 0 | |
| 14 | -28dB ~ -24dB | 1 | 1 | 0 | 1 | |
| 15 | 28 ~ | 1 | 1 | 1 | 0 | |
| 16 | -28 ~ | 1 | 1 | 1 | 1 | |

FIG.23

| NO. | POWER CONTROL VALUE | BIT PATTERN ||||  NOTE |
|---|---|---|---|---|---|---|
| | | 4 | 3 | 2 | 1 | |
| 1 | (AUTONOMOUS TRANSMISSION POWER VALUE) AS IT IS | 0 | 0 | 0 | 0 | |
| 2 | (AUTONOMOUS TRANSMISSION POWER VALUE) -4dB | 0 | 0 | 0 | 1 | |
| 3 | (AUTONOMOUS TRANSMISSION POWER VALUE) +4dB | 0 | 0 | 1 | 0 | |
| 4 | (AUTONOMOUS TRANSMISSION POWER VALUE) -8dB | 0 | 0 | 1 | 1 | |
| 5 | (AUTONOMOUS TRANSMISSION POWER VALUE) +8dB | 0 | 1 | 0 | 0 | |
| 6 | (AUTONOMOUS TRANSMISSION POWER VALUE) -12dB | 0 | 1 | 0 | 1 | |
| 7 | (AUTONOMOUS TRANSMISSION POWER VALUE) +12dB | 0 | 1 | 1 | 0 | |
| 8 | (AUTONOMOUS TRANSMISSION POWER VALUE) -16dB | 0 | 1 | 1 | 1 | |
| 9 | (AUTONOMOUS TRANSMISSION POWER VALUE) +16dB | 1 | 0 | 0 | 0 | |
| 10 | (AUTONOMOUS TRANSMISSION POWER VALUE) -20dB | 1 | 0 | 0 | 1 | |
| 11 | (AUTONOMOUS TRANSMISSION POWER VALUE) +20dB | 1 | 0 | 1 | 0 | |
| 12 | (AUTONOMOUS TRANSMISSION POWER VALUE) -24dB | 1 | 0 | 1 | 1 | |
| 13 | (AUTONOMOUS TRANSMISSION POWER VALUE) +24dB | 1 | 1 | 0 | 0 | |
| 14 | (AUTONOMOUS TRANSMISSION POWER VALUE) -28dB | 1 | 1 | 0 | 1 | |
| 15 | (AUTONOMOUS TRANSMISSION POWER VALUE) +28dB | 1 | 1 | 1 | 0 | |

FIG.27

| NO. | POWER CONTROL VALUE | BIT PATTERN ||||||  NOTE |
|---|---|---|---|---|---|---|---|---|
| | | 6 | 5 | 4 | 3 | 2 | 1 | |
| 1 | 0dB | 0 | 0 | 0 | 0 | 0 | 0 | |
| 2 | 4dB | 0 | 0 | 0 | 0 | 0 | 1 | |
| 3 | 8dB | 0 | 0 | 0 | 0 | 1 | 0 | |
| 4 | 12dB | 0 | 0 | 0 | 0 | 1 | 1 | |
| 5 | 16dB | 0 | 0 | 0 | 1 | 0 | 0 | |
| 6 | 20dB | 0 | 0 | 0 | 1 | 0 | 1 | |
| 7 | 24dB | 0 | 0 | 0 | 1 | 1 | 1 | |

FIG.28

| NO. | POWER CONTROL VALUE | BIT PATTERN | | | | NOTE |
|---|---|---|---|---|---|---|
| | | 4 | 3 | 2 | 1 | |
| 1 | 3.0W | * | 0 | 0 | 0 | |
| 2 | 3.0W-4dB/2W | * | 1 | 1 | 1 | |
| 3 | 3.0W-8dB/2W-4dB | * | 1 | 1 | 0 | |
| 4 | 3.0W-2dB/2W-8dB | * | 1 | 0 | 1 | |
| 5 | 3.0W-16dB/2W-12dB | * | 1 | 0 | 0 | |
| 6 | 3.0W-20dB/2W-16dB | * | 0 | 1 | 1 | |
| 7 | 3.0w-24dB/2W-20dB | * | 0 | 1 | 0 | |
| 8 | 3.0W-24dB/2W-24dB | * | 0 | 0 | 1 | |

RCR STANDARD

METHOD OF DETERMINING INITIAL TRANSMISSION POWER

BACKGROUND OF THE INVENTION

The present invention generally relates to methods of determining initial transmission power, and more particularly to a method of determining initial transmission power when controlling the transmission power during a call between mobile stations or between a mobile station and a fixed network in a mobile communication system which uses digital mobile telephones or the like.

FIG. 1 shows an example of the system structure of a digital mobile telephone system. In FIG. 1, there are shown mobile stations a and b, base stations A and B, a switching center E, and a fixed network N. The base stations A and B each include a common amplifier unit and a modem unit, and the switching center E includes a switching unit and a base station controller. In this mobile telephone system, when the transmission power (down transmission power) of the base station or the transmission power (up transmission power) of the mobile station is too large, the radio wave wraparounds to an adjacent zone and there is a possibility that the communication between other stations in the adjacent zone may be affected by interference caused thereby. For this reason, it is necessary to control the up and down transmission power to optimum values.

The control of the up transmission power is carried out as follows. That is, the base station measures the reception level of a talking channel signal from the mobile station and instructs the transmission power to the mobile station so that the measured reception level approaches a predetermined up reference reception level. The mobile station adjusts the up transmission power depending on this instruction from the base station.

On the other hand, the control of the down transmission power is carried out as follows. That is, the mobile station measures the reception level of a talking channel signal from the base station and notifies the measured reception level to the base station. In response to this notification from the mobile station, the base station adjusts the down transmission power so that the measured reception level approaches a predetermined down reference reception level.

FIGS. 2 through 7 are diagrams for explaining the control sequence of the up and down transmission powers. FIGS. 2 and 3 show the control sequence of the down transmission power when calling from the mobile station. FIG. 4 shows the control sequence of the down transmission power when the mobile station is called. FIGS. 5 and 6 show the control sequence of the up transmission power when calling from the mobile station. In addition, FIG. 7 shows the control sequence of the up transmission power when the mobile station is called.

First, a description will be given of a case where a call is made from the mobile station so as to talk with another mobile station or a fixed network via the base station, by referring to FIGS. 2 and 3 and FIGS. 5 and 6.

In a standby mode, the mobile station measures the reception level of signals from an own zone in which the mobile station is located and the reception level of signals from a peripheral zone which is adjacent to the own zone, and stores these reception levels in a measured data storage 9. When a call request is generated, the mobile station sends a calling radio state report having a format shown in FIG. 8 to the base station. As shown in FIG. 8, the calling radio state report includes the reception level of the own zone which is measured during the standby mode and stored in the measured data storage 9, and a mobile station type 11 which has a format shown in FIG. 9 and indicates the maximum transmission power with which the mobile station can transmit (3 W in the case of a 3 W mobile station, and 2 W in the case of a 2 W mobile station).

An up transmission power 12 of the mobile station when sending the calling radio state report is controlled by an autonomous transmission power controller 10. In other words, the reception level of the own zone measured in the standby mode is compared with a predetermined threshold value, and the magnitude of the transmission power is autonomously controlled and reduced if the reception level is greater than the predetermined threshold value. This control, however, is carried out using a maximum transmission power which can be output as a reference (maximum transmission power reported from the base station by report information 1).

When the base station receives the calling radio state report, the base station notifies the contents of the calling radio state report to the base station controller of the switching center. If the reception level of the own zone reported in the calling radio state report satisfies a sufficient quality, the base station controller allocates a free talk channel of the own zone with respect to the mobile station by a channel allocator 4, and instructs the allocated talk channel to the mobile station by a radio channel designation. This radio channel designation has a format shown in FIG. 10.

The control of the down transmission power of the talk channel from the base station to the mobile station is carried out as shown in FIGS. 2 and 3. First, when the talk channel is instructed by the radio channel designation, the mobile station starts the call by shifting to the instructed talk channel. A down transmission power 7 of the base station immediately after the start of this call is an initial transmission power value 6 which is a predetermined fixed value. The mobile station measures the reception level of the down-line transmitted at the initial transmission power value 6 by a reception level measuring unit 13, and reports the measured result to the base station.

At the base station, the reported reception level of the down-line is compared with a predetermined down reference reception level by a transmission power value determining unit 8, and makes a transmission at a down transmission power 7' which is determined so that the reported reception level of the down-line converges to the down reference reception level. Thereafter, the base station successively controls the down transmission power until the call is terminated, based on the down reception level which is successively reported from the mobile station, so that the reported down reception level converges to the reference reception level.

The control of the up transmission power from the mobile station to the base station is carried out as shown in FIGS. 5 and 6. The operation up to the point where the base station makes the radio channel designation with respect to the mobile station is the same as that described above in conjunction with FIG. 2. However, in this case, an initial transmission power value 22 of the mobile station is also notified when making the radio channel designation. An up transmission power 18 of the mobile station immediately after the mobile station shifts to the talk channel and starts the call is this initial transmission power value 22 which is notified and is a predetermined fixed value.

The base station measures by a reception level measuring unit 19 the reception level of the up-line transmitted from the mobile station at the initial transmission power value 22, and compares the measured value with an up reference reception level by a transmission power value determining unit 20. The transmission power value determining unit 20 determines the up transmission power value of the mobile station so that the measured value (reception level of the up-line) converges to the up reference reception level, and notifies the determined up transmission power value to the mobile station.

In response to this notification, the mobile station sets the notified up transmission power value as an up transmission power 18', and makes the call at this up transmission power 18'. Thereafter, until the call is terminated, the mobile station successively controls the up transmission power based on the reception level of the up-line successively notified from the base station, so that the notified reception level of the up-line converges to the up-line reference level.

Next, a description will be given of a case where the mobile station is called from the fixed network or the like, by referring to FIGS. 4 and 7. When a call is received from the fixed network or the like, a call request is notified from the base station to the mobile station. When the mobile station receives this call request as a receive request, the mobile station sends a called radio state report having a format shown in FIG. 11 to the base station. This called radio state report includes the reception levels of the own zone and the peripheral zone measured during the standby mode and stored in the measured data storage 9, and the mobile station type 11 having the format shown in FIG. 9. In addition, a transmission power 12 at the time when the mobile station sends the called radio state report is controlled by the autonomous transmission power controller 10, similarly as described above. In other words, the autonomous transmission power controller 10 compares the reception level of the own zone measured in the standby mode with a predetermined threshold value, and controls the transmission power 12 so as to reduce the magnitude thereof if the measured reception level is greater than the predetermined threshold value.

The operations of controlling the up transmission power and the down transmission power after the base station receives the called radio state report are the same as those of the mobile station at the time of the calling shown in FIGS. 3 and 6.

Conventionally, the initial transmission power value, which is the transmission power immediately after the call is started, is a predetermined fixed value for both the up-line and the down-line. For this reason, if the initial transmission power value is determined to a high fixed value by taking as the reference a mobile station which is located near the edge of the zone, the mobile station near the base station will transmit at the high transmission power immediately after the call is started for both the up-line and the down-line. The initial transmission power is controlled to eventually converge to a suitable value, however, in the case of the mobile station near the base station, the transmission is made at the high transmission power until the transmission power is reduced to the suitable value, and there is a possibility of interfering the communication in another zone.

In addition, the maximum transmission power (for example, 3 W in the case of a 3 W mobile station) at which the transmission can be made differs depending on the individual mobile station. Hence, it is difficult to determine an optimum initial transmission power for all of the mobile stations.

SUMMARY OF THE INVENTION

Accordingly, it is a general object of the present invention to provide a novel and useful method of determining initial transmission power, in which the problems described above are eliminated.

Another and more specific object of the present invention is to provide a method of determining an initial transmission power in a mobile communication system having a base station and at least one mobile station, comprising the steps of (a) measuring at the mobile station a reception level of a down control channel from the base station, and (b) determining an initial transmission power value of a down talk channel of the base station based on the reception level measured in said step (a). According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Still another object of the present invention is to provide a method of determining an initial transmission power in a mobile communication system having a base station and at least one mobile station, comprising the steps of (a) measuring at the mobile station a reception level of a down control channel from the base station and reporting the measured reception level to the base station, and (b) obtaining a comparison result by comparing at the base station the reception level of the down control channel with a threshold valve which is used to determine an initial transmission power value of a down talk channel, and determining the initial transmission power value of the down talk channel based on the comparison result. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

A further object of the present invention is to provide a method of determining an initial transmission power in a mobile communication system having a base station and at least one mobile station, comprising the steps of (a) measuring at the mobile station a reception level of a down control channel from the base station and reporting to the base station a comparison result which is obtained by comparing the measured reception level with a threshold value which is used to determine an initial transmission power value of a down talk channel, and (b) determining at the base station the initial transmission power value of the down talk channel based on the comparison result reported from the mobile station. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Another object of the present invention is to provide a method of determining an initial transmission power in a mobile communication system having a base station and at least one mobile station, comprising the steps of (a) measuring at the mobile station a reception level of a down control channel from the base station, (b) obtaining a comparison result at the mobile station by comparing the measured reception level with a threshold value which is used to determine an initial transmission power value of a down talk channel, (c) determining at the mobile station the initial transmission power value of the down talk channel based on the comparison result and reporting the initial transmission power value of the down talk channel to the base station, and (d) setting at the base station the initial transmission power value of the down talk channel reported from the mobile station. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Still another object of the present invention is to provide a method of determining an initial transmission power in a mobile communication system having a base station and at least one mobile station, comprising the steps of (a) measuring at the base station a reception level of an up control channel from the mobile station, and (b) determining an initial transmission power value of an up talk channel of the mobile station based on the reception level measured in said step (a). According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

A further object of the present invention is to provide a method of determining an initial transmission power in a mobile communication system having a base station and at least one mobile station, comprising the steps of (a) measuring at the base station a reception level of an up control channel from the mobile station, and notifying to the mobile station a comparison result which is obtained by comparing the measured reception level with a threshold value which is used to determine an initial transmission power value of an up talk channel, and (b) determining at the mobile station as the initial transmission power value of the up talk channel a value which is obtained by correcting a transmission power value of the up control channel by the comparison result notified by said step (a). According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Another object of the present invention is to provide a method of determining an initial transmission power in a mobile communication system having a base station and at least one mobile station, comprising the steps of (a) reporting from the mobile station a transmission power value of an up control channel with respect to the base station, (b) measuring at the base station a reception level of the up control channel from the mobile station in response to the report made in said step (a), (c) obtaining a comparison result at the base station by comparing the measured reception level with a threshold value which is used to determine an initial transmission power value of an up talk channel, (d) notifying from the base station to the mobile station, as the initial transmission power value of the up talk channel, a value which is obtained by correcting a transmission power value of the up control channel reported from the mobile station by the comparison result, and (e) setting at the mobile station the value notified by said step (d) as the initial transmission power value of the up talk channel. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Still another object of the present invention is to provide a method of determining an initial transmission power in a mobile communication system having a base station and at least one mobile station, comprising the steps of (a) reporting from the mobile station to the base station mobile station type information and a control value which is used for making an autonomous transmission power control with respect to a transmission power of an up control channel, (b) measuring at the base station a reception level of the up control channel and obtaining a comparison result by comparing the measured reception level with a threshold value which is used to determine an initial transmission power value of an up talk channel, (c) notifying from the base station to the mobile station, as the initial transmission power value of the up talk channel dependent on the mobile station type, a value which is obtained by correcting by the comparison result a transmission power value which is determined by the mobile station type and the control value which are reported in said step (a), and (d) setting at the mobile station the value notified by said step (c) as the initial transmission power value of the up talk channel. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

A further object of the present invention is to provide a method of determining an initial transmission power in a mobile communication system having a base station and at least one mobile station, comprising the steps of (a) measuring at the base station a reception level of an up control channel from the mobile station, and notifying the measured reception level to the mobile station, (b) obtaining a comparison result at the mobile station by comparing the measured reception level notified by said step (a) with a threshold value which is used to determine an initial transmission power value of an up talk channel, and (c) setting at the mobile station, as the initial transmission power value of the up talk channel, a value which is obtained by correcting a transmission power value of the up control channel by the comparison result. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Another object of the present invention is to provide a method of determining an initial transmission power in a mobile communication system having a base station and at least one mobile station, comprising the steps of (a) measuring at the base station a reception level of an up control channel from the mobile station, and notifying to the mobile station a comparison result which is obtained by comparing the measured reception level with a threshold value which is used to determine an initial transmission power value of an up talk channel, and (b) determining at the mobile station as the initial transmission power value of the up talk channel a value which is obtained by correcting by the comparison result notified by said step (a) a transmission power value which is determined by mobile station type information and a control value which is used for an autonomous transmission power control. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Still another object of the present invention is to provide a method of determining an initial transmission power in a mobile communication system having a base station and at least one mobile station, comprising the steps of (a) measuring at the base station a reception level of an up control channel from the mobile station, and notifying the measured reception level to the mobile station, (b) obtaining a comparison result at the mobile station by comparing the measured reception level notified by said step (a) with a threshold value which is used to determine an initial transmission power value of an up talk channel, and (c) setting at the mobile station, as the initial transmission power value of the up talk channel, a value which is obtained by correcting by the comparison result a transmission power value which is determined by mobile station type information and a control value which is used for an autonomous transmission power control. According to the method of the present invention, the initial transmission power is determined to an optimum value from the start for each mobile station, where the initial transmission power refers to the transmission power of the mobile station and the base station after the call starts and until the transmission power is controlled to the optimum value. For this reason, it is possible to prevent interference of the communication in another zone due to unnecessarily high transmission power, and it is possible to build a communication system having a high reliability. In addition, it is possible to reduce the power consumption because the use of unnecessarily high transmission power is prevented.

Other objects and further features of the present invention will be apparent from the following detailed description when read in conjunction with the accompanying drawings.

BRIEF DESCRIPTION OF THE DRAWINGS

FIG. 8 is a diagram showing a format of a calling radio state report;

FIG. 9 is a diagram showing a format of a mobile station type;

FIG. 10 is a diagram showing a format of a radio channel designation;

FIG. 11 is a diagram-showing a called radio state report;

FIG. 20 is a diagram showing bit patterns of a level difference value;

FIG. 23 is a diagram showing bit patterns of an up transmission power control value;

FIG. 27 is a diagram showing bit patterns of an autonomous transmission power control value;

FIG. 28 is a diagram showing bit patterns of an up initial transmission power value;

DESCRIPTION OF THE PREFERRED EMBODIMENTS

Figure 12A:
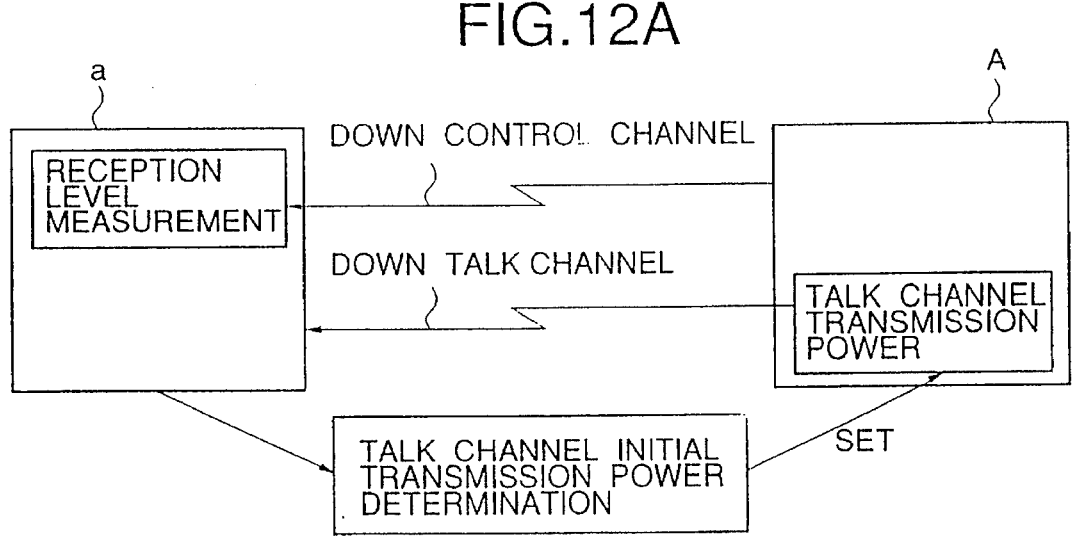
FIGS. 12A and 12B respectively are block diagrams for explaining the operating principle of the present invention.
Figure 12B:
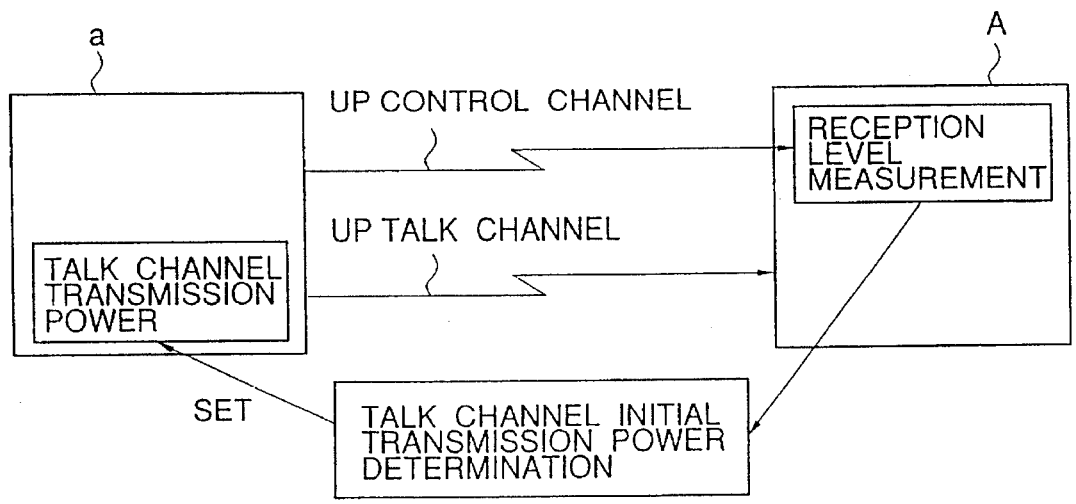

First, a description will be given of the operating principle of the present invention, by referring to FIGS. 12A and 12B. FIG. 12A shows one aspect of the present invention, and FIG. 12B shows another aspect of the present invention.

In FIG. 12A, a mobile station a measures the reception level of a down control channel from a base station A, and an initial transmission power value of a down talk channel of the base station is determined based on the measured reception level.

The mobile station a shown in FIG. 12A may measure the reception level of the down control channel from the base station A and report the measured reception level to the base station A. In this case, the base station A compares the reported reception level of the down control channel with a threshold value which is used to determine the initial transmission power value of the down talk channel. The initial transmission power value of the down talk channel is determined based on a result of this comparison.

Alternatively, the mobile station a shown in FIG. 12A measures the reception level of the down control channel from the base station A, and compares the measured reception level with a threshold value which is used to determine the initial transmission power value of the down talk channel. The mobile station a reports a result of the comparison to the base station A. Based on the reported comparison result, the base station A determines the initial transmission power value of the down talk channel.

As another alternative, the mobile station a shown in FIG. 12A measures the reception level of the down control channel from the base station A, and compares the measured reception level with a threshold value which is used to determine the initial transmission power value of the down talk channel. The mobile station also determines the initial transmission power value of the down talk channel based on a result of this comparison, and reports the determined initial transmission power value to the base station A. The base station A uses the reported initial transmission power value as the initial transmission power value of the down control channel.

On the other hand, in FIG. 12B, a base station A measures the reception level of an up control channel from a mobile station a. An initial transmission power value of an up talk channel of the mobile station a is determined based on the measured reception level.

The base station A shown in FIG. 12B may measure the reception level of the up control channel from the mobile station a, and compare the measured reception level with a threshold value which is used to determine the initial transmission power value of the up talk channel. In this case, the base station A notifies a result of this comparison to the mobile station a, and the mobile station a sets as the initial transmission power value of the up talk channel a value which is obtained by correcting the transmission power value of the up control channel by the notified comparison result.

Alternatively, the mobile station A shown in FIG. 12B reports the transmission power value of the up control channel to the base station A, and the base station A measures the reception level of the up control channel from the mobile station A in response to this report from the mobile station a. In this case, the base station A compares the measured reception level with a threshold value which is used to determine the initial transmission power value of the up talk channel. A value which is obtained by correcting the transmission power value of the up control channel reported from the mobile station a by the comparison result is notified to the mobile station a as the initial transmission power value of the up talk channel. The mobile station a sets the notified value as the initial transmission power value of the up talk channel.

As another alternative, the mobile station a shown in FIG. 12B reports to the base station A mobile station type information and a control value which is used to control the transmission power of the up control channel by an autonomous transmission power control. The base station A measures the reception level of the up control channel, and compares the measured reception level with a threshold value which is used to determine the initial transmission power value of the up talk channel. The base station A obtains a value by correcting the transmission power value determined by the reported mobile station type and control value using the comparison result. In addition, the base station A notifies this obtained value to the mobile station a as the initial transmission power value of the up talk channel that is dependent on the mobile station type. The mobile station a sets the notified value as the initial transmission power value of the up talk channel.

In addition, the base station A shown in FIG. 12B may measure the reception level of the up control channel from the mobile station a, and notify the measured reception level to the mobile station a. In this case, the mobile station a compares the notified reception level with a threshold value which is used to determined the initial transmission power value of the up talk channel. A value which is obtained by correcting the transmission power value of the up control channel by the comparison result is set as the initial transmission power value of the up talk channel.

Further, in FIG. 12B, the initial transmission power value of the up talk channel may be correcting the transmission power value which is determined by the mobile station type information and the control value of the autonomous transmission power control, in place of the transmission power value of the up control channel.

According to the present invention employing the first aspect as shown in FIG. 12A, the mobile station a measures the reception level of the down control channel from the base station A, and the initial transmission power value of the down talk channel of the base station A is determined based on the measured reception level. This determination of the initial transmission power value may be made in the mobile station a and the result reported to the base station A or, may be made in the base station A by reporting the reception level or the comparison result which is obtained by comparing the reception level with the threshold value from the mobile station a to the base station A.

On the other hand, according to the present invention employing the second aspect as shown in FIG. 12B, the reception level of the up control channel from the mobile station a is measured in the base station A, and the initial transmission power value of the up talk channel of the mobile station a is determined based on the measured reception level. This determination of the initial transmission power value may be made in the base station A and the result reported to the mobile station a or, may be made in the mobile station a by reporting the reception level or the comparison result which is obtained by comparing the reception result with the threshold value from the base station A to the mobile station a.

Figure 13:
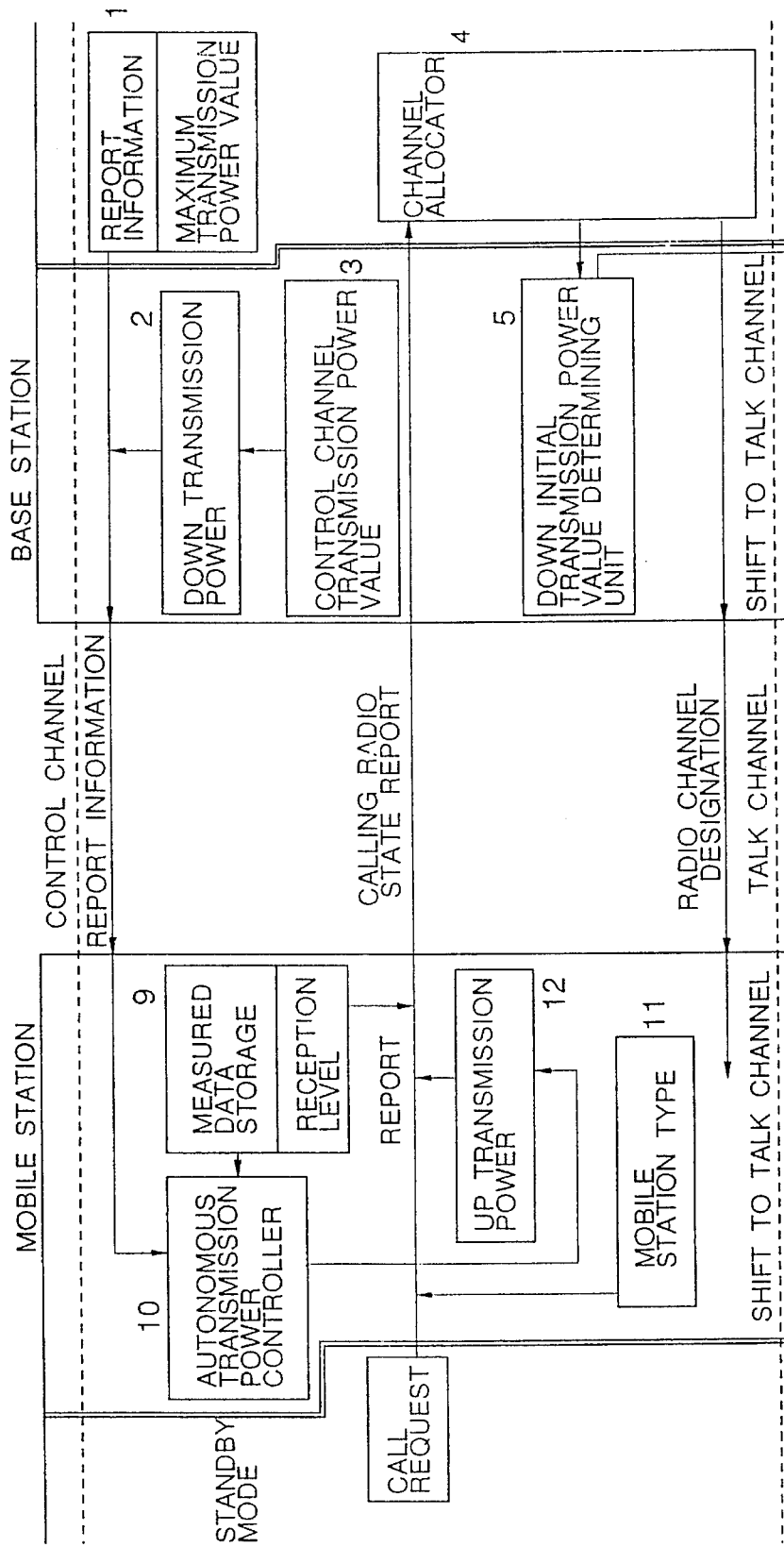
FIG. 13 is a diagram for explaining a control sequence of a down transmission power when a mobile station calls in a first embodiment of the present invention.
Figure 14:
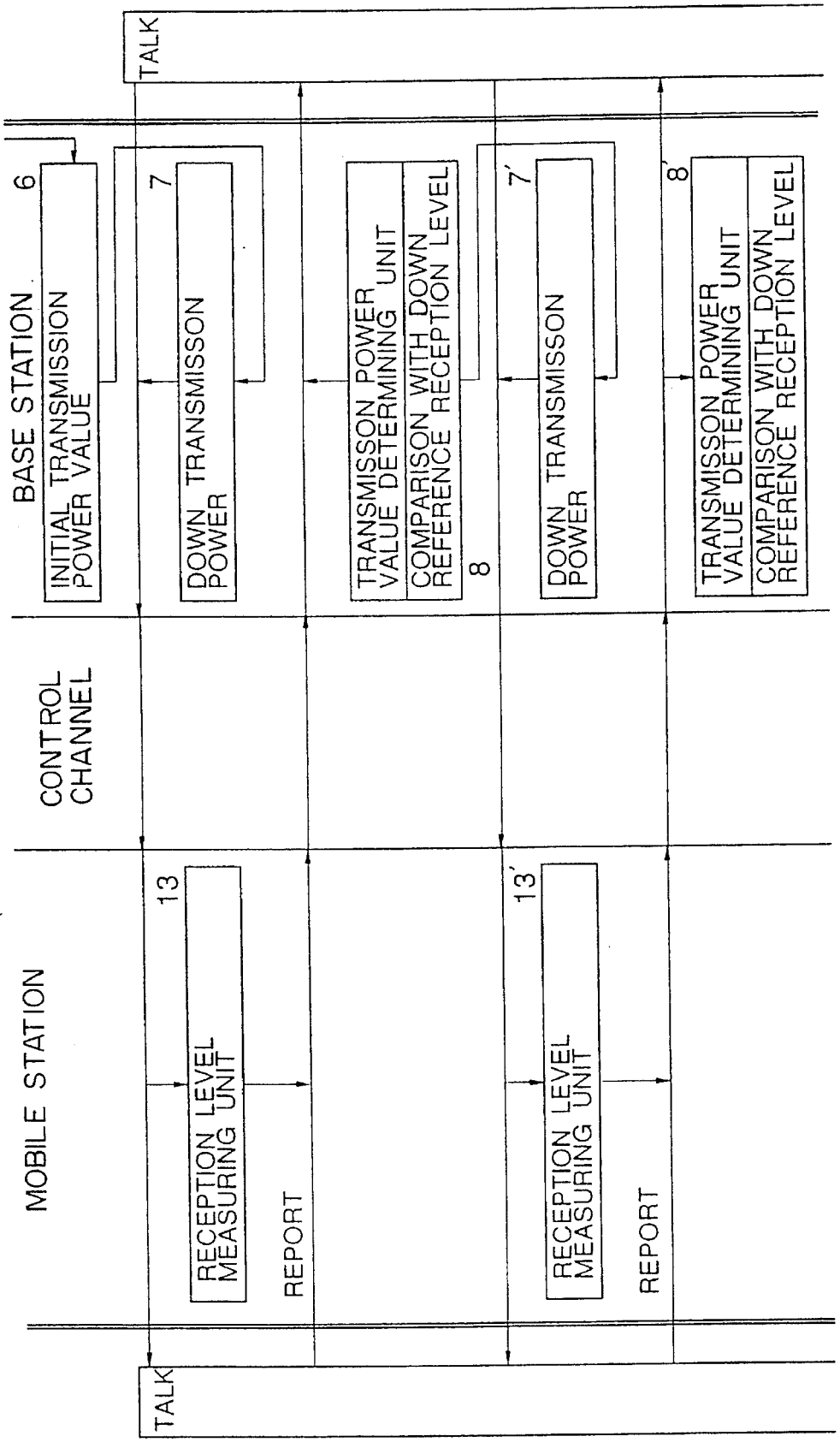
FIG. 14 is a diagram for explaining the control sequence of the down transmission power when the mobile station calls in the first embodiment.

Next, a description will be given of a first embodiment of the method of determining the initial transmission power according to the present invention, by referring to FIGS. 13 and 14. FIGS. 13 and 14 show control sequences of the down transmission power when the mobile station calls in this embodiment. In this embodiment, the initial transmission power value of the down line is made as follows.

When a call request exists, the mobile station sends a calling radio state report having the format shown in FIG. 8. Similarly to the conventional case described above, the calling radio state report includes the reception level of the own zone measured during the standby mode and stored in a measured data storage 9, and a mobile station type 11 which indicates the maximum transmission power at which the mobile station can transmit. Furthermore, similarly as described above, an up transmission power 12 of the mobile station at the time of sending the calling radio state report is autonomously reduced by an autonomous transmission power controller 10 when the reception level of the own zone measured during the standby mode is greater than a threshold value. The up transmission power 12 is controlled with reference to the maximum transmission power (maximum transmission power reported by the report information) that can be output.

When the calling radio state report is received at the base station, a channel allocator 4 allocates a free talk channel of the own zone to the mobile station if the reception level of the own zone reported in the calling radio state report satisfies a sufficient quality. The allocated talk channel is instructed to the mobile station by a radio channel designation. The radio channel designation is made in the format shown in FIG. 10. The mobile station shifts to the instructed talk channel in response to this radio channel designation, and the call is started.

In addition, in the base station, a down initial transmission power value determining unit 5 compares the reception level of the down control channel in the standby mode reported in the calling radio state report when the mobile station calls with a predetermined value for controlling the down transmission power. An optimum down initial transmission power value is determined based on a result of this comparison, by taking a control channel down transmission power value 3 as a reference.

Figure 15:
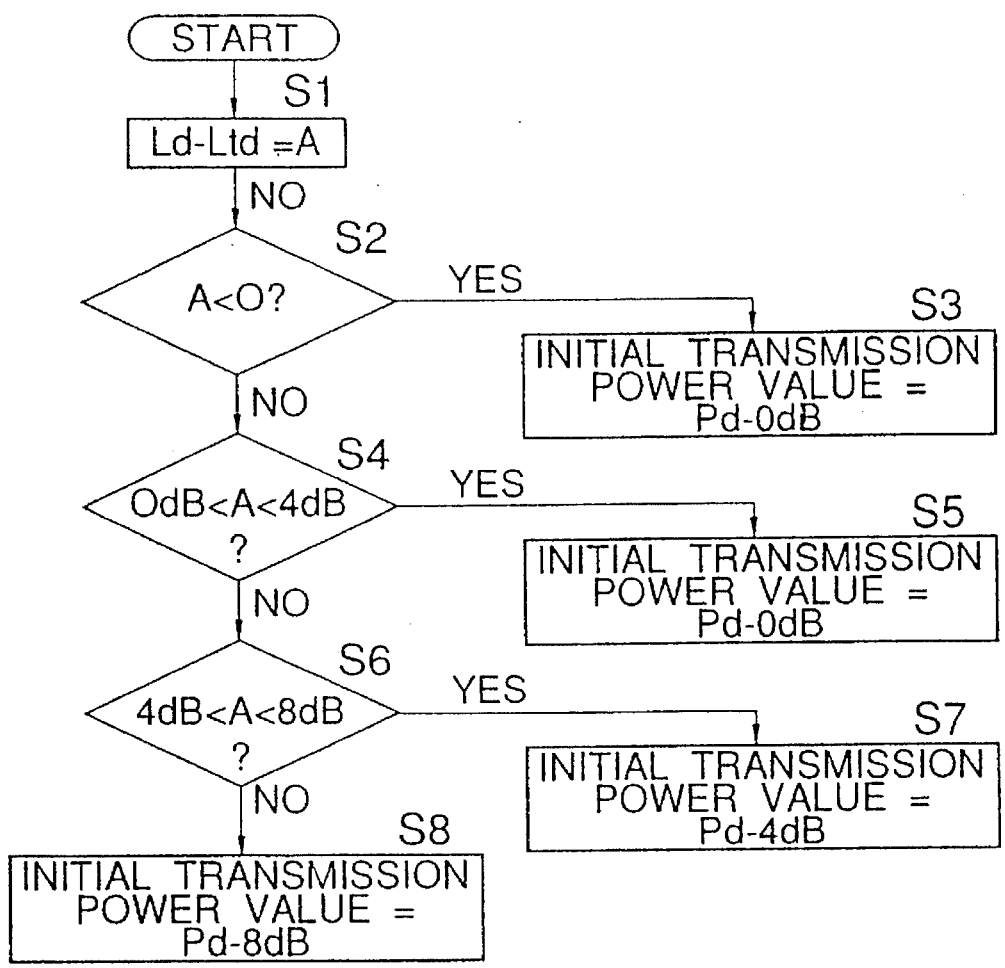
FIG. 15 is a flow chart for explaining a process of determining a down initial transmission power value in the first embodiment.

FIG. 15 shows a process for determining the down initial transmission power value. In FIG. 15, Ld denotes a reported reception level, Ltd denotes a threshold value for controlling the down transmission power, and Pd denotes a control channel down transmission power value.

In FIG. 15, a step S1 obtains a difference A between the reception level Ld and the threshold value Ltd, and a step S2 decides whether or not A<0. A step sets the initial transmission power value to Pd−0 dB if the decision result in the step S2 is YES. On the other hand, a step S4 decides whether or not 0 dB< A<4 dB if the decision result in the step S2 is NO. If the decision result in the step S4 is YES, a step S5 sets the initial transmission power value to Pd−0 dB.

If the decision result in the step S4 is NO, a step S6 decides whether or not 4 dB<A<8 dB. A step S7 sets the initial transmission power value to Pd −4 dB if the decision result in the step S8 is YES. On the other hand, a step S8 sets the initial transmission power value to Pd−8 dB if the decision result in the step S6 is NO.

Accordingly, if the difference A is not higher than 4 dB, the down initial transmission power value 6 is set the same as a transmission power value Pd (=number 3) of the control channel. In addition, if the reception level Ld is higher than the threshold value Ltd by more than 4 dB and less than 8 dB, the initial transmission power value 6 is set to a value which is 4 dB lower than the transmission power value Pd. Further, if the reception level Ld is higher than the threshold value Ltd by more than 8 dB, the initial transmission power value 6 is set to a value which is 8 dB lower than the transmission power value Pd of the control channel.

Figure 1:
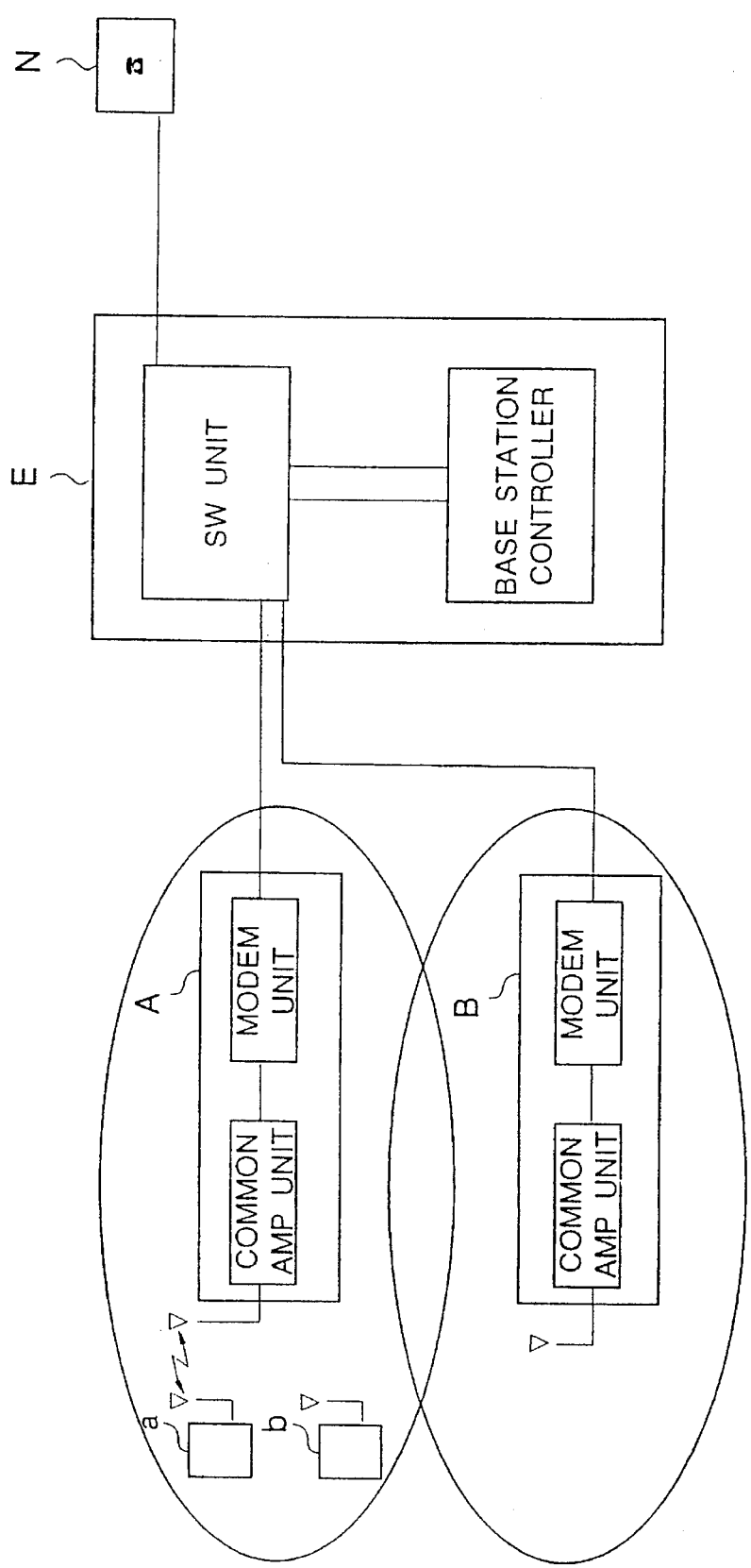
FIG. 1 is a system block diagram showing an example of the system structure of a digital mobile telephone system.
Figure 2:
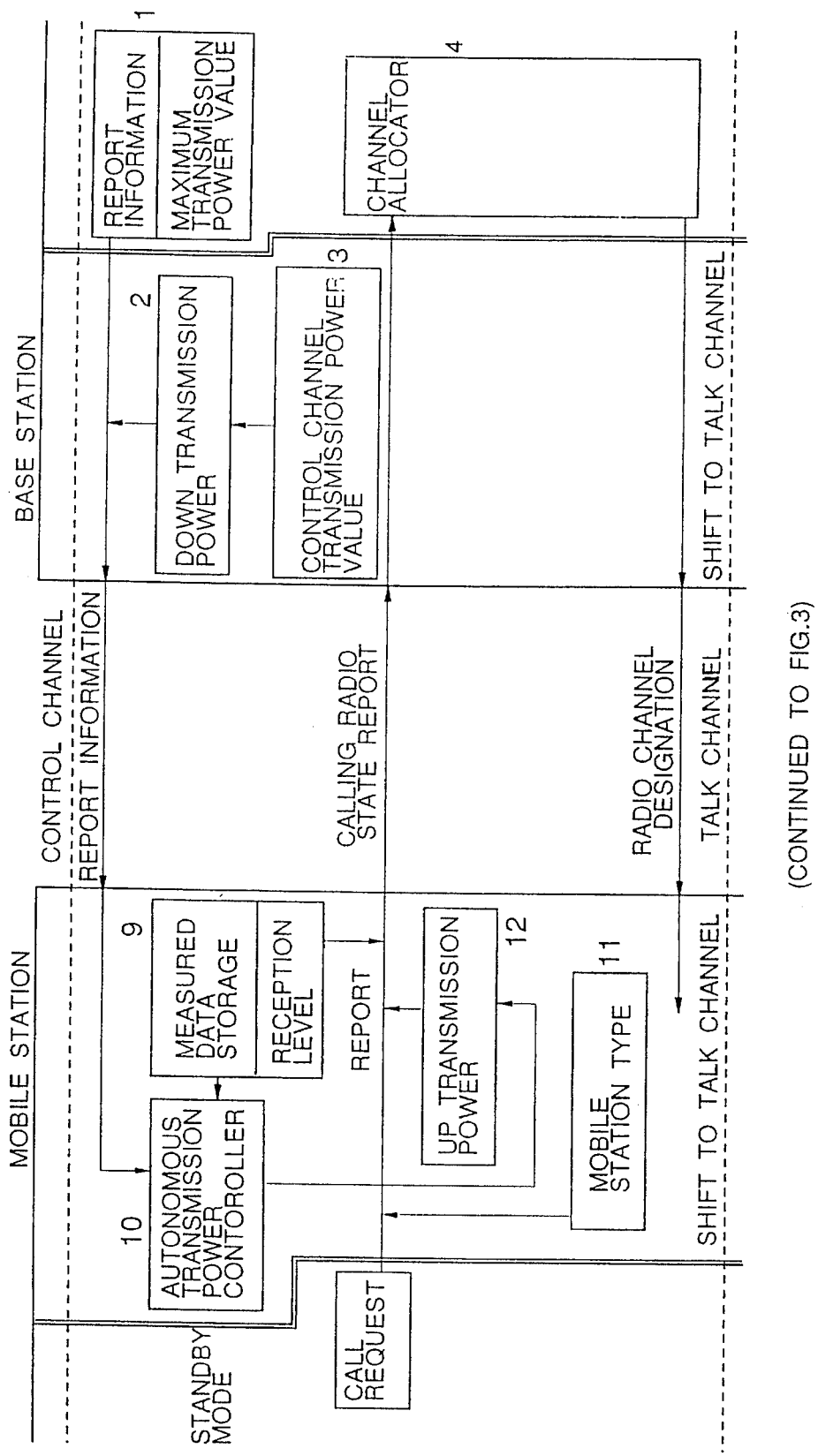
FIG. 2 is a diagram for explaining a control sequence of the down transmission power when a mobile station calls.
Figure 3:
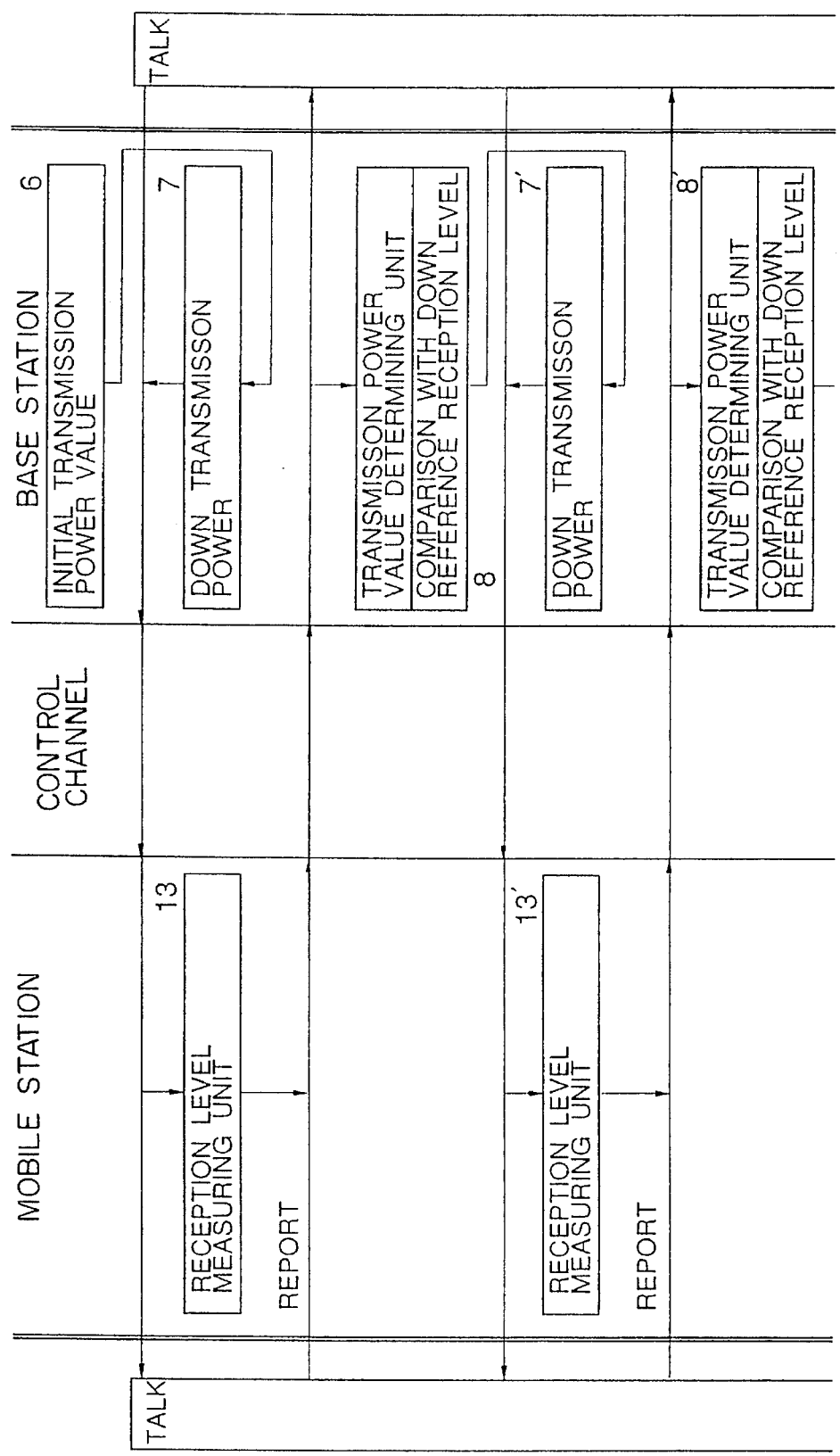
FIG. 3 is a diagram for explaining the control sequence of the down transmission power when the mobile station calls.
Figure 4:
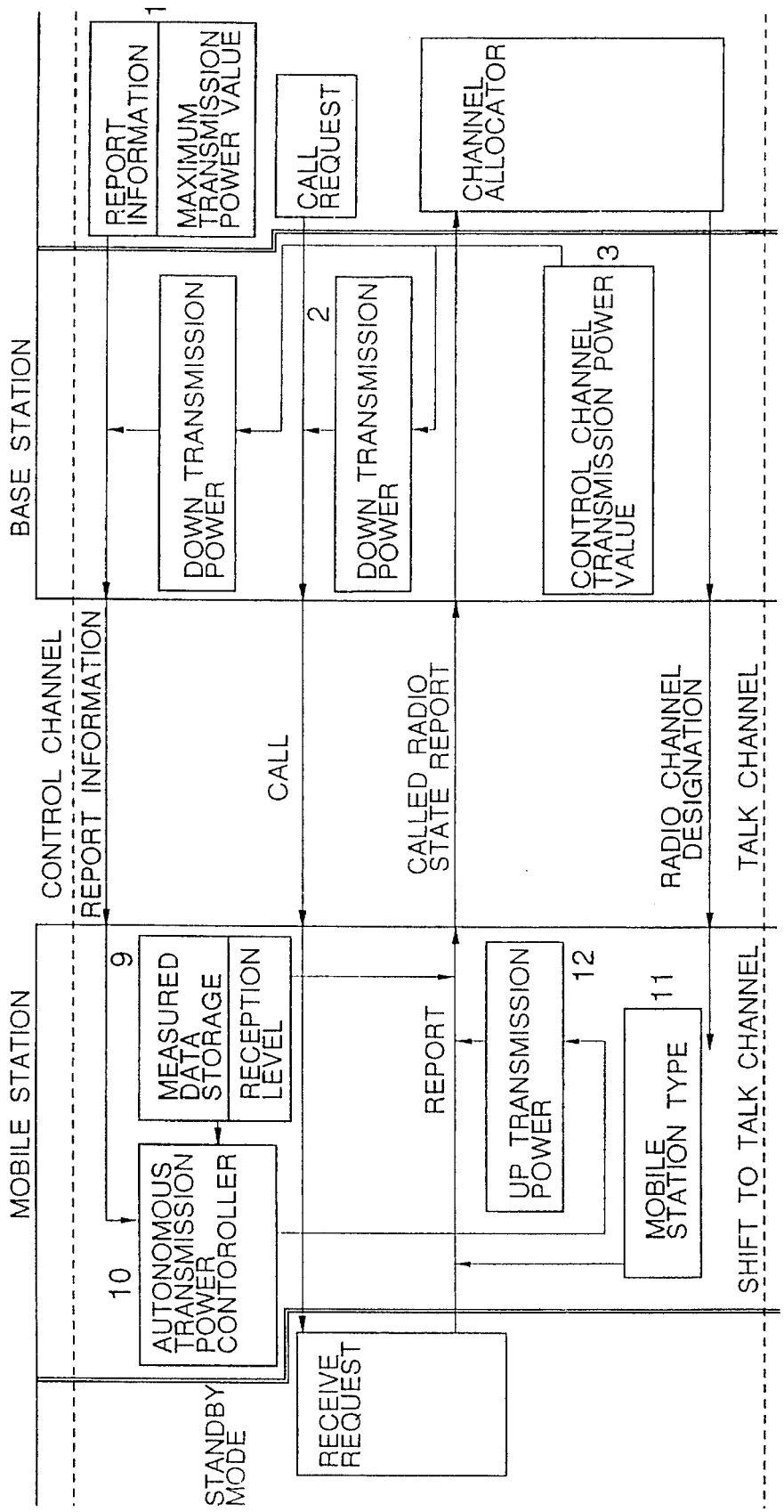
FIG. 4 is a diagram for explaining a control sequence of the down transmission power when the mobile station is called.
Figure 5:
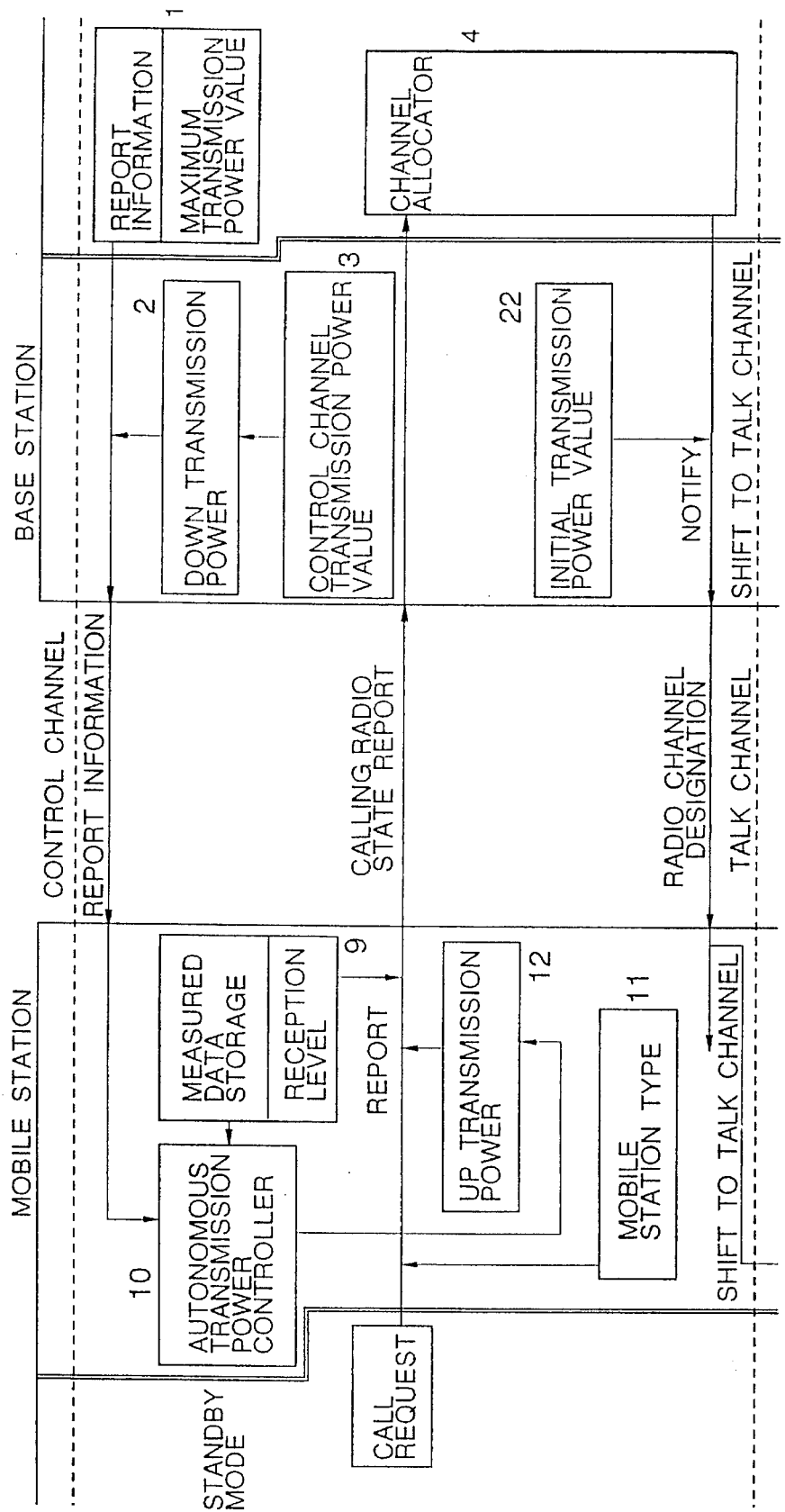
FIG. 5 is a diagram for explaining a control sequence of the up transmission power when the mobile station calls.

The down transmission power control procedure which is carried out thereafter in the base station is the same as that of the conventional case described above in conjunction with FIG. 3. In other words, the base station receives the report on the reception level of the down line from the mobile station. In addition, the magnitude of a down transmission power 7 is controlled so that the reported reception level converges to the down reference reception level, and this procedure is repeated until the call is terminated.

Figure 16:
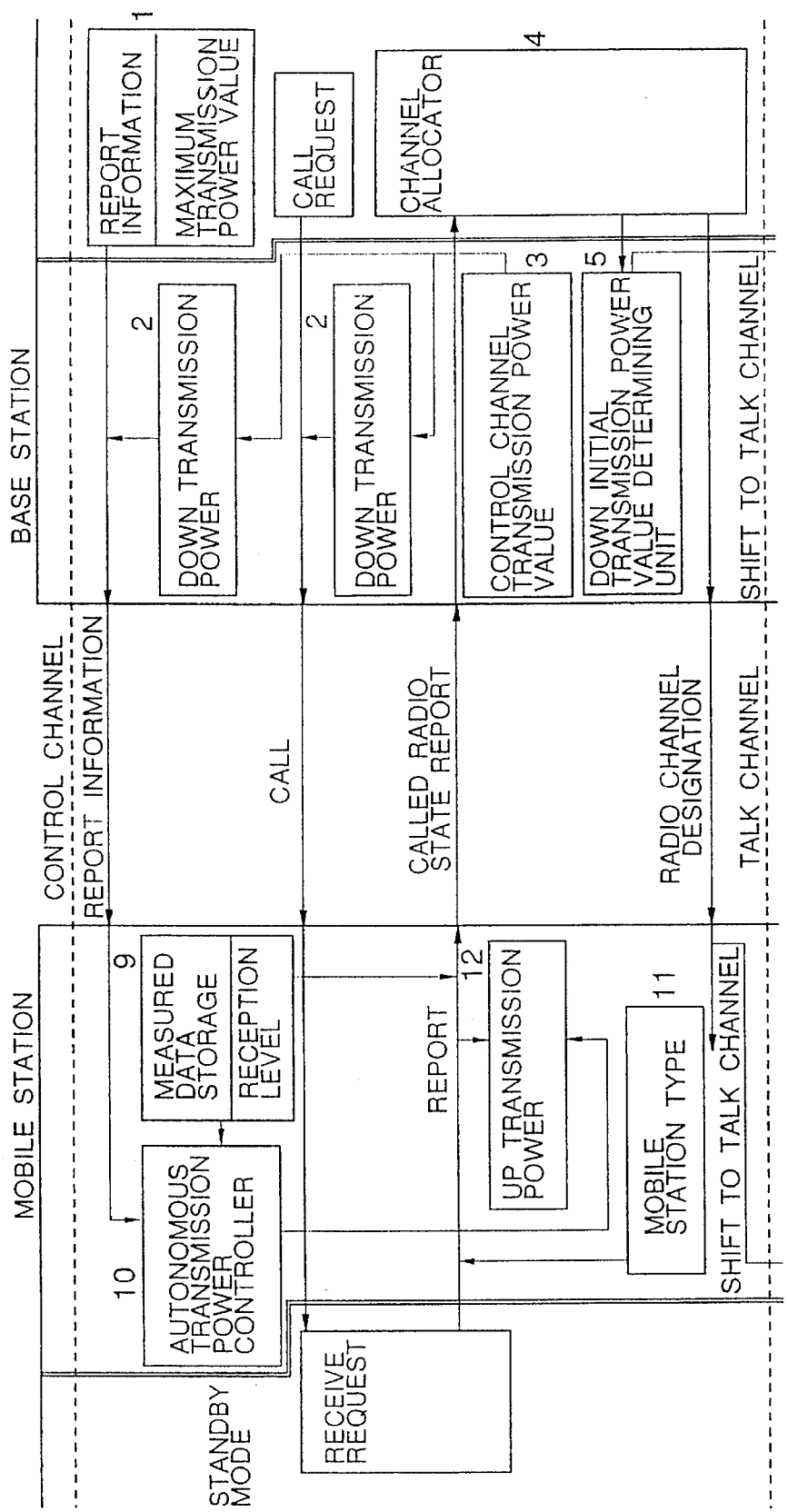
FIG. 16 is a diagram for explaining a control sequence of the down transmission power when the mobile station is called in the first embodiment.

FIG. 16 shows the control sequence of the down transmission power when the mobile station is called in the first embodiment. In this case, when the call request from the base station to the mobile station exists, the mobile station sends the called radio state report having the format shown in FIG. 11. This called radio state report includes the reception levels of the own zone and the peripheral zone measured during the standby mode and stored in a measured data storage 9. The procedure of determining the down initial transmission power value in the base station based on these reception levels is the same as that shown in FIGS. 13 and 14 at the time of the calling.

Figure 17:
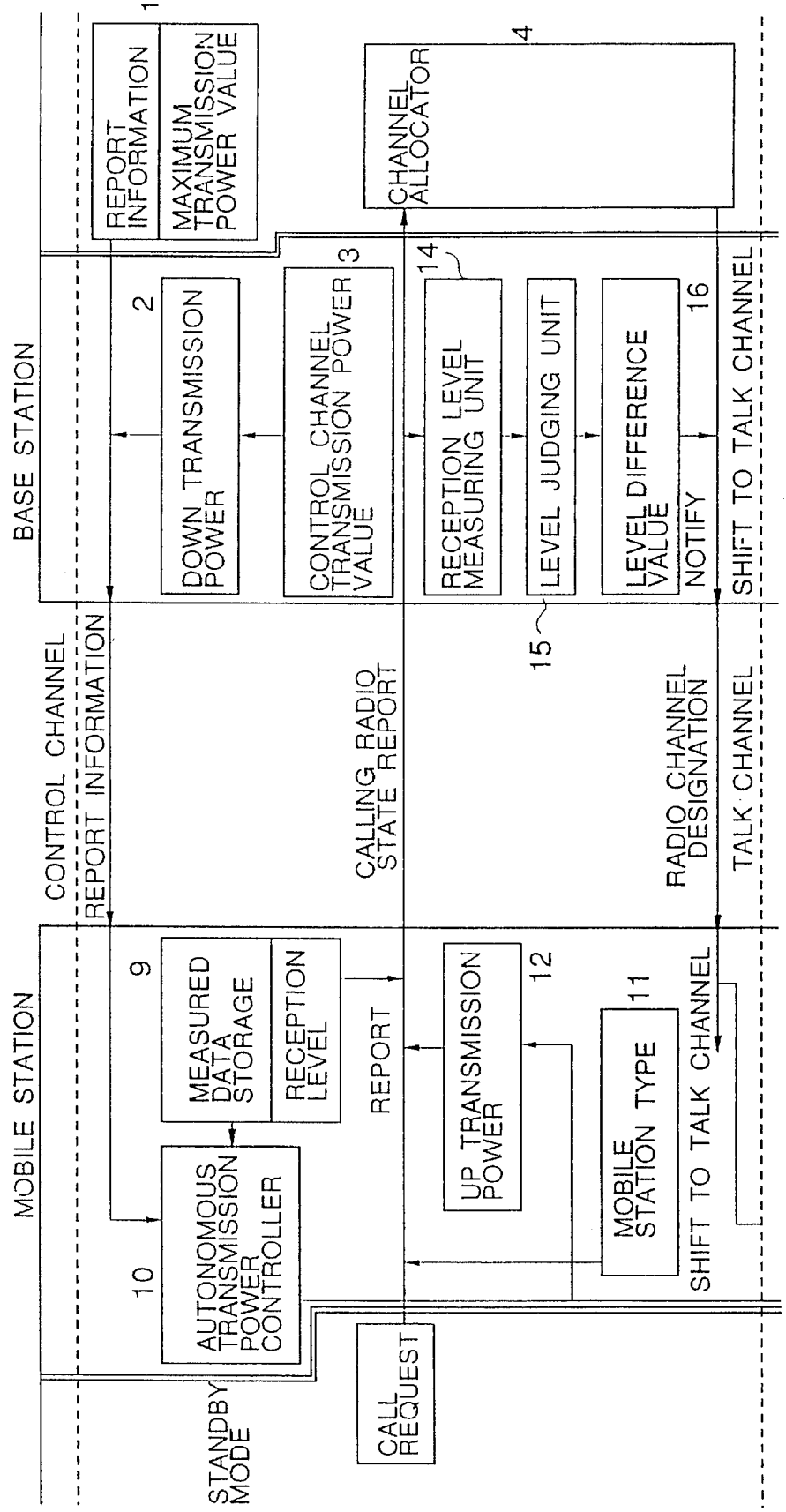
FIG. 17 is a diagram for explaining a control sequence of an up transmission power when the mobile station calls in a second embodiment of the present invention.
Figure 18:
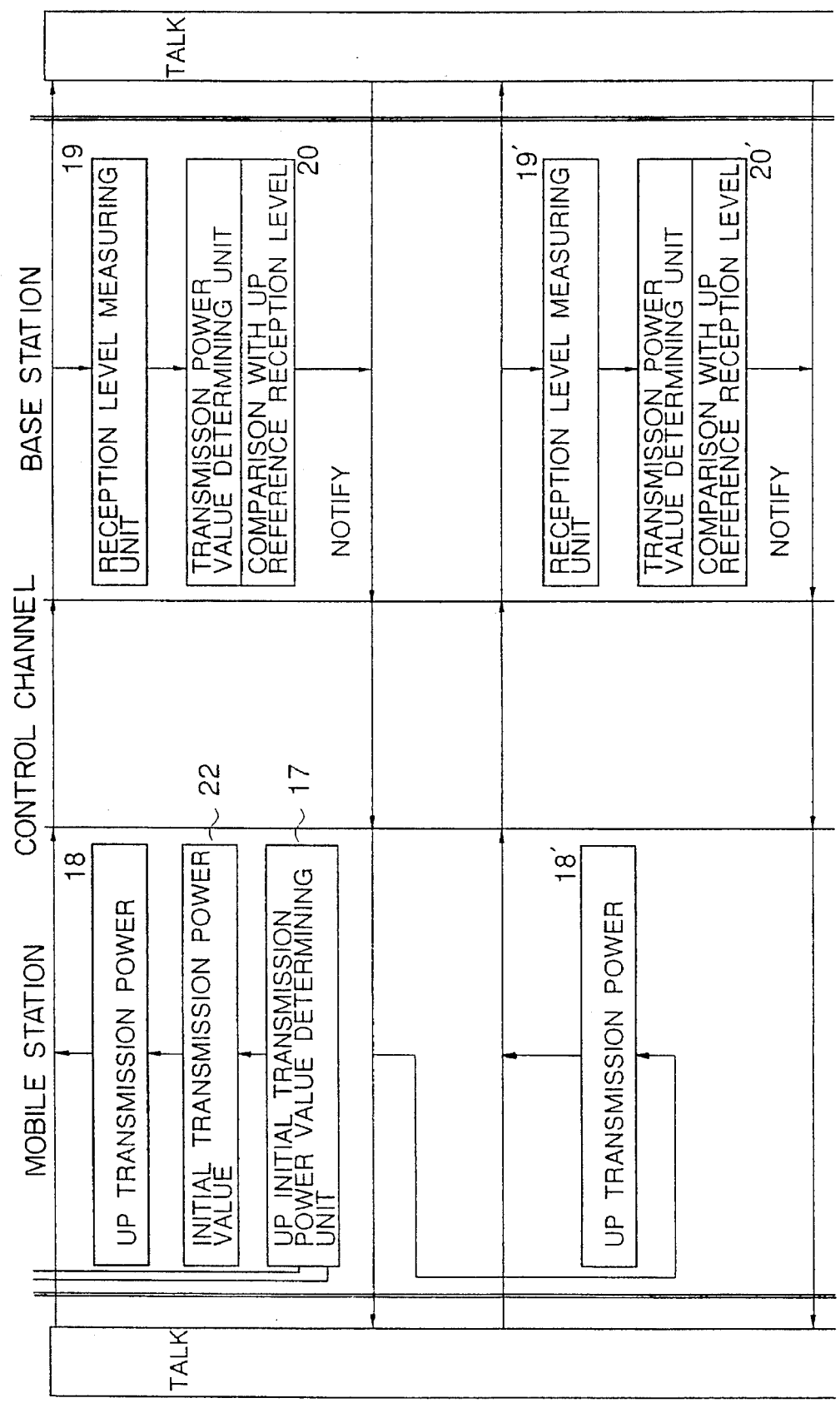
FIG. 18 is a diagram for explaining the control sequence of the up transmission power when the mobile station calls in the second embodiment.

Next, a description will be given of a second embodiment of the method of determining the initial transmission power according to the present invention, by referring to FIGS. 17 and 18. FIGS. 17 and 18 show control sequences of the up transmission power when the mobile station calls in the second embodiment. In this embodiment, the initial transmission power value of the up line is determined as follows.

The procedure up to the point where the calling radio state report is made is the same as that of the first embodiment described above. In other words, when a call request exists, the mobile station sends the calling radio state report .which includes the reception levels of the own zone and the peripheral zone measured during the standby mode and the mobile station type 11. In addition, the up transmission power 12 at the time of sending the calling radio state report is controlled by the autonomous transmission power controller 10.

The channel allocation carried out by the channel allocator 4 when the base station receives the calling radio state report and the operation of instructing the talk channel to the mobile station based on the channel allocation are also the same as those carried out in the first embodiment described above.

The control of the up transmission power of the mobile station is carried out in the following manner .

When the base station receives the calling radio state report, the reception level of the calling radio state report is measured in a reception level measuring unit 14. A level judging unit 15 compares the measured reception level with a threshold value which is used to determine an optimum up initial transmission power value, and judges a level difference value 16 between the measured reception level and the threshold value. This level difference value 16 is divided into the levels shown in FIG. 20, and a bit pattern of the corresponding level is notified to the mobile station together with the free talk channel number when making the radio channel designation.

When the mobile station is notified of the level difference value 16, an up initial transmission power value determining unit 17 sets as an initial transmission power value 22 a transmission power which is obtained by correcting the up transmission power 12 of the control channel at the time when the calling radio state report is made by the level difference value 16. The transmission on the up line is made by using this initial transmission power value 22 as an up transmission power 18 of the talk channel.

Figure 19:
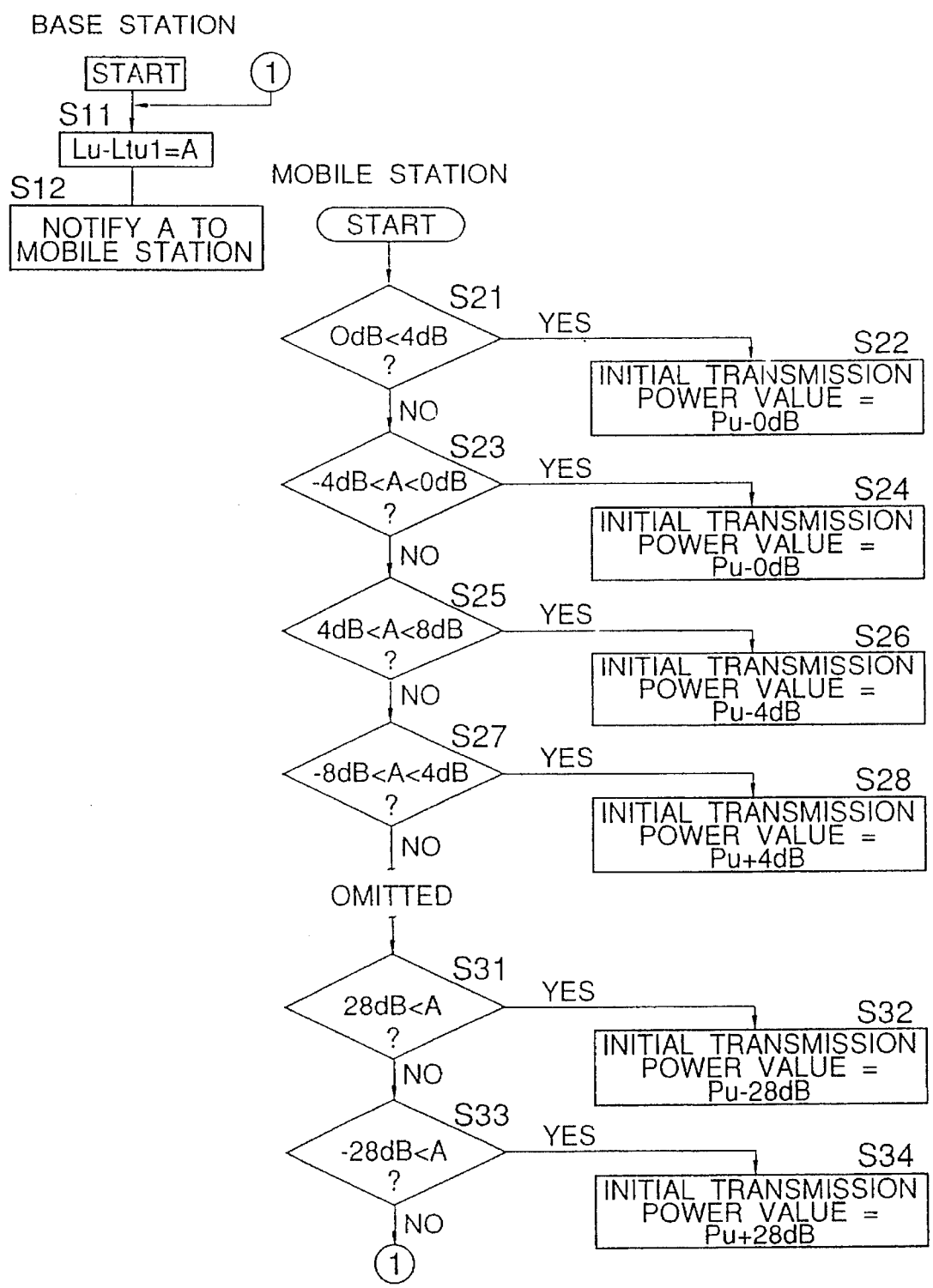
FIG. 19 is a flow chart for explaining a process of determining an up initial transmission power value in the second embodiment.

FIG. 19 shows the process of determining this up initial transmission power value in this second embodiment. In FIG. 19, Lu denotes the measured reception level, Ltu1 denotes the threshold value for controlling the up transmission power, and Pu denotes the transmission power which is autonomously controlled.

As shown in FIG. 19, the base station obtains a level difference A (=number16) between the reception level Lu and the threshold value Ltu1 for controlling the up transmission power in a step S11, and notifies this level difference A to the mobile station in a step S12.

In the mobile station, a step S21 shown in FIG. 19 decides whether or not 0 dB<A<4 dB, and a step S22 sets the initial transmission power value to Pu−0 dB if the decision result in the step 21 is YES. On the other hand, if the decision result in the step S21 is NO, a step S23 decides whether or not −4 dB<A <0 dB, and a step S24 sets the initial transmission power value to Pu−0 dB if the decision result in the step S23 is YES. If the decision result in the step S23 is NO, a step S25 decides whether or not 4 dB<A<8 dB, and a step S26 sets the initial transmission power value to Pu−4 dB if the decision result in the step S25 is YES. If the decision result in the step S25 is NO, a step S27 decides whether or not −8 dB<A <−4 dB, and a step S28 sets the initial transmission power to Pu+4 dB.

A step S31 decides whether or not 28 dB<A, and a step S32 sets the initial transmission power value to Pu−28 dB if the decision result in the step S31 is YES. On the other hand, if the decision result in the step S31 is NO, a step S33 decides whether or not −28 dB<A, and a step S34 sets the initial transmission power value to Pu+28 dB if the decision result in the step S33 is YES. The process returns to the step S11 of the base station if the decision result in the step S33 is NO.

In other words, if the level difference A satisfies 0 dB<A<4 dB or −4 dB<A<0 dB, the mobile station sets an initial transmission power value 22 equal to the up transmission power 12. In addition, if the level difference A satisfies 4 dB<A<8 dB, the initial transmission power value 22 is set to a transmission power 4 dB lower than the up transmission power Pu. If the level difference A satisfies −8 dB A<−4 dB, the initial transmission power value 22 is set to a transmission power 4 dB higher than the up transmission power Pu.

Hence, for the following conditions shown on the left side, tile initial transmission power value 22 is set as shown on the corresponding right side, although some of the conditions are omitted in FIG. 19 for the sake of convenience.

---

8 dB < A < 12 dB →
    Initial transmission power value = Pu − 8 dB
−12 dB < A < −8 dB →
    Initial transmission power value = Pu + 8 dB
12 dB < A < 16 dB →
    Initial transmission power value = Pu − 12 dB
−16 dB < A < −12 dB →
    Initial transmission power value = Pu + 12 dB
16 dB < A < 20 dB →
    Initial transmission power value = Pu − 16 dB
−20 dB < A < −16 dB →
    Initial transmission power value = Pu + 16 dB
20 dB < A < 24 dB →
    Initial transmission power value = Pu − 20 dB
−24 dB < A < −20 dB →
    Initial transmission power value = Pu + 20 dB
24 dB < A < 28 dB →
    Initial transmission power value = Pu − 24 dB
−28 dB < A < −24 dB →
    Initial transmission power value = Pu + 24 dB
28 dB < A →
    Initial transmission power value = Pu − 28 dB
A < 28 dB →
    Initial transmission power value = Pu + 28 dB

---

Figure 6:
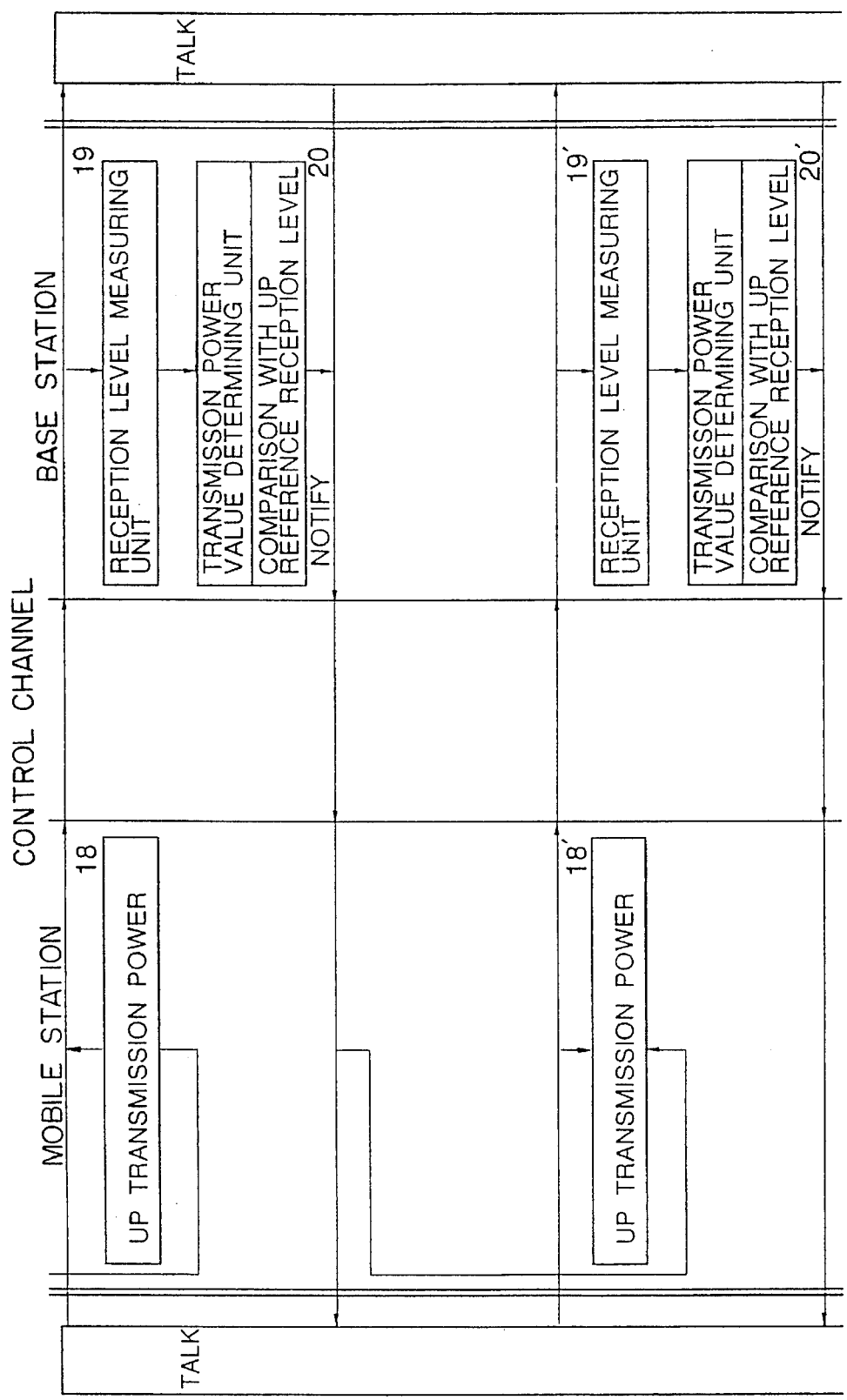
FIG. 6 is a diagram for explaining the control sequence of the up transmission power when the mobile station calls.
Figure 7:
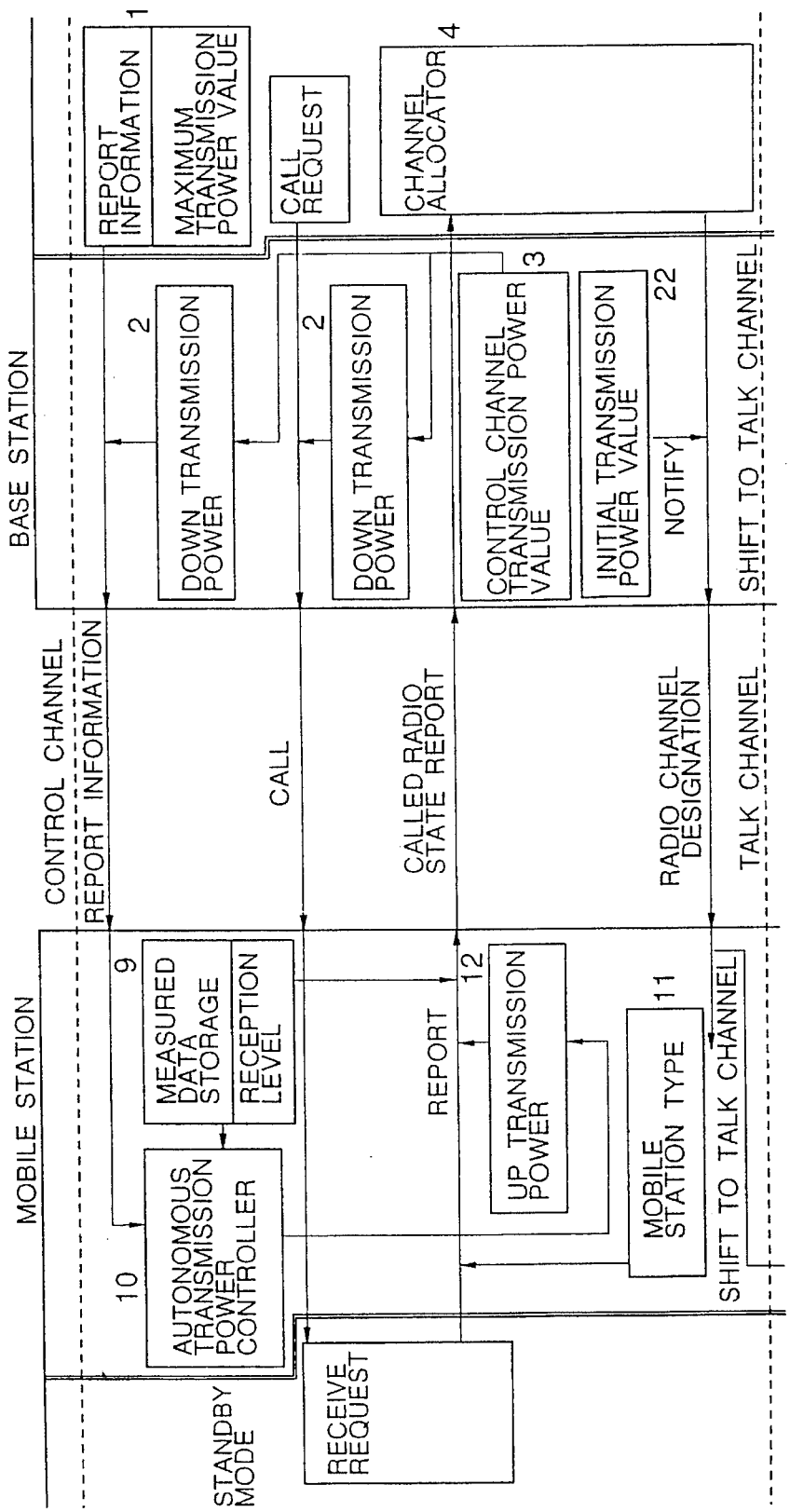
FIG. 7 is a diagram for explaining the control sequence of an up transmission power when the mobile station is called.

The control procedure of the up transmission power carried out thereafter is the same as the control sequence of the up transmission power in the conventional case described above in conjunction with FIG. 6. In other words, the base station measures by the reception level measuring unit 19 the up reception level transmitted at the up transmission power 18, and the transmission power value determining unit 20 compares the measured reception level with an up reference reception level. This transmission power value determining unit 20 determines the up transmission power so that the measured reception level converges to the reference reception level, and notifies the mobile station of the determined up transmission power. The mobile station which is notified of this up transmission power sets the up transmission power 18' to the notified up transmission power. If the up transmission power 18' may be the same as the initial transmission power value 22, the up transmission power 18' is set to a transmission power equal to the initial transmission power value 22. The up transmission power is controlled thereafter until the call is terminated.

Figure 21:
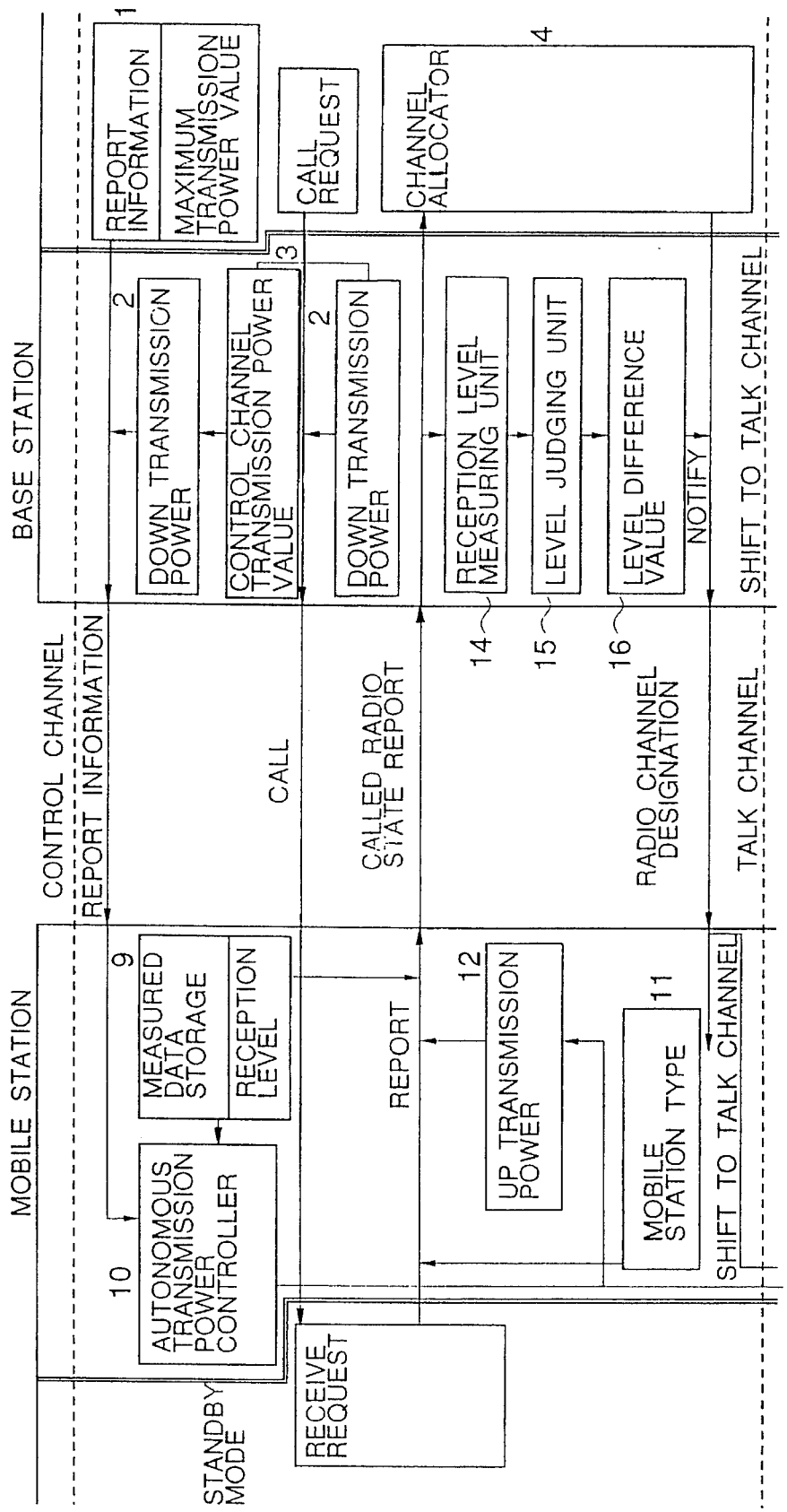
FIG. 21 is a diagram for explaining a control sequence of the up transmission power when the mobile station is called in the second embodiment.

FIG. 21 shows a control sequence of the up transmission power when the mobile station is called in the second embodiment.

In this case, when a request to call the mobile station exists, the called radio state report having the format shown in FIG. 11 is transmitted. When the base station receives the called radio state report, the reception level measuring unit 14 measures the reception level of the called radio state report, and the level judging unit 15 judges the level difference value 16 between the measured reception level and the threshold value. The level difference value 16 is notified to the mobile station when making the radio channel designation. The operation thereafter is the same as that at the time of making the call.

Figure 22:
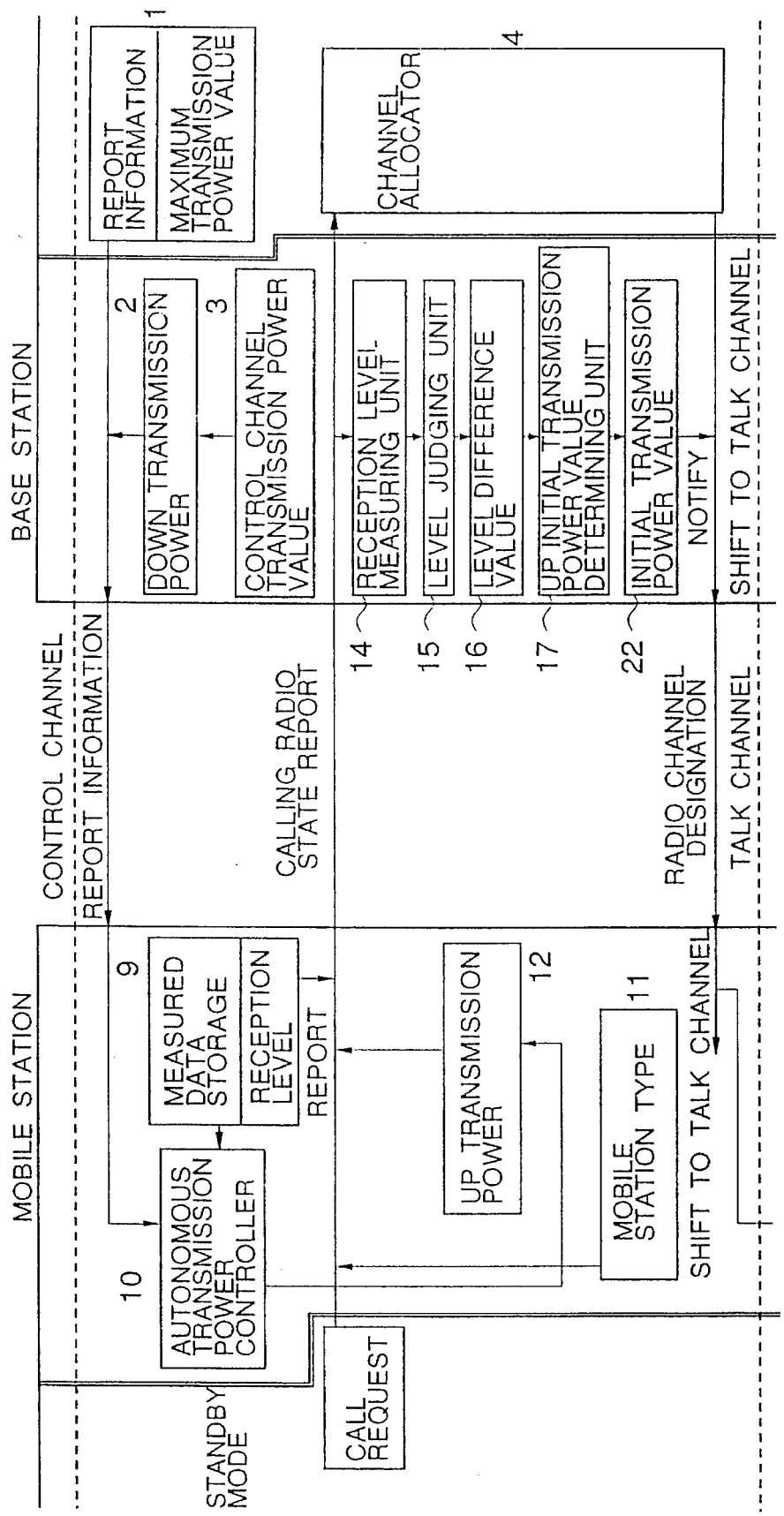
FIG. 22 is a diagram for explaining a control sequence of the up transmission power when the mobile station calls in a third embodiment of the present invention.

Next, a description will be given of a third embodiment of the method of determining the initial transmission power, by referring to FIG. 22. FIG. 22 shows a control sequence of the up transmission power when the mobile station calls in the third embodiment. In this third embodiment, the initial transmission power value of the up line is determined as follows.

The procedure up to the point where the calling radio state report is made with respect to the base station from the mobile station due to the generation of the call request at the mobile station, and the operation of allocating the channels by the channel allocator 4 when the base station receives the calling radio state report and making the radio channel designation with respect to the mobile station based on the channel allocation, are the same as those of the second embodiment described above. However, in this third embodiment, the calling radio state report includes the up transmission power 12 of the control channel which transmits the calling radio state report.

This third embodiment differs from the second embodiment in that, although the second embodiment determines the up initial transmission power value when the mobile station receives the notification of the level difference value from the base station, this third embodiment determines the up initial transmission power value in the base station. In addition, in this third embodiment, the determined up transmission power value is notified to the mobile station when making the radio channel designation, and the mobile station determines the up transmission power 18 based on this notification.

In other words, the control of the up transmission power of the mobile station is carried out as follows in this third embodiment.

When the base station receives the calling radio state report, the reception level of the calling radio state report is measured by the reception level measuring unit 14. The level judging unit 15 compares the measured reception level with the threshold value which is used to determine the optimum up initial transmission power value, and obtains the level difference value 16 between the measured reception level and the threshold value. The up initial transmission power value determining unit 17 sets as the initial transmission power value 22 a transmission power which is obtained by correcting the up transmission power 12 reported from the mobile station by the level difference value 16. This initial transmission power value 22 is converted into a bit pattern shown in FIG. 23 and is notified to the mobile station at the time of the radio channel designation. The mobile station which receives this notification sets the up transmission power 18 as the initial transmission power value 22.

Figure 24:
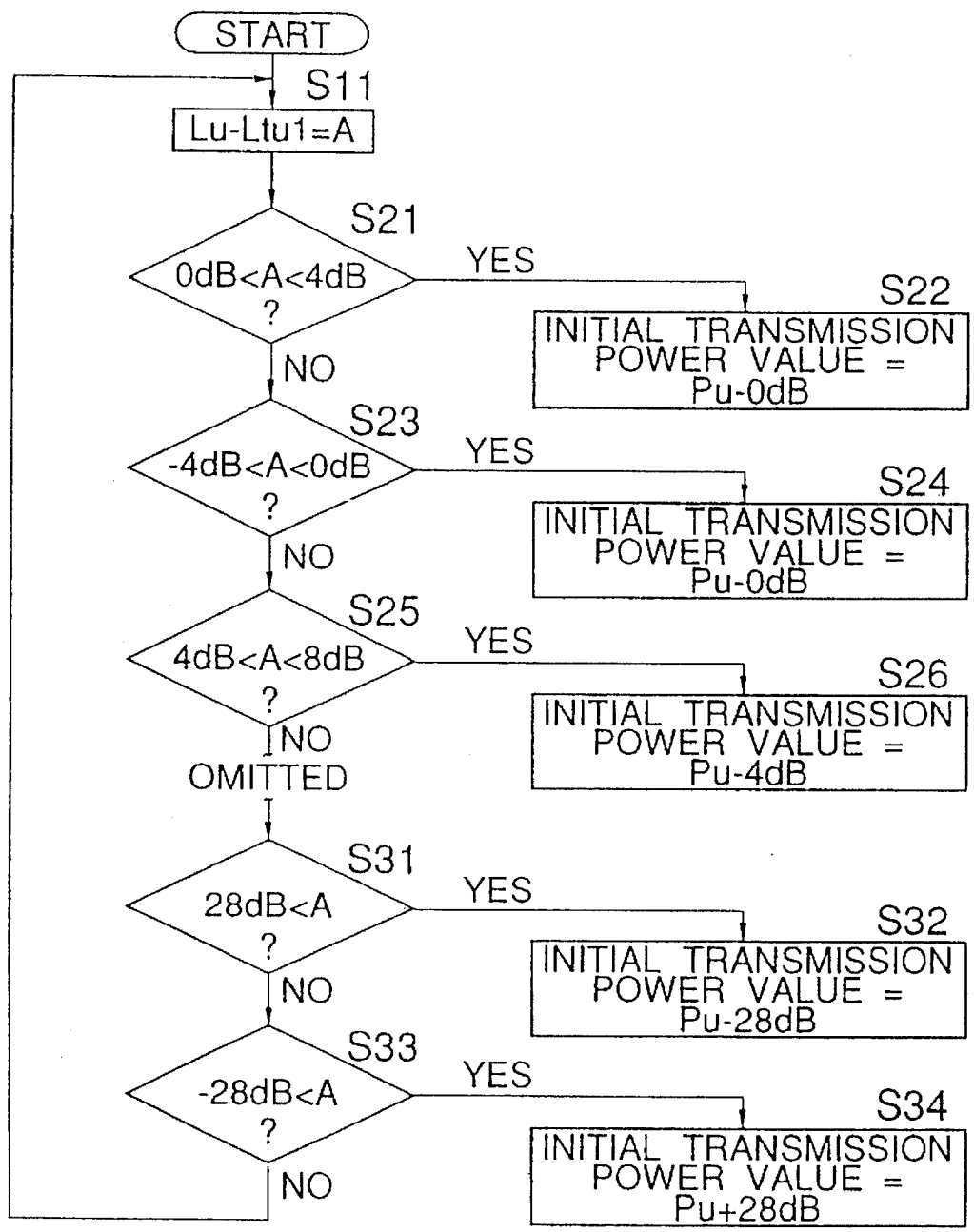
FIG. 24 is a flow chart for explaining a process of determining an up initial transmission power value in the third embodiment.

FIG. 24 is a flow chart for explaining a process of determining the up initial transmission power value from the level difference value. As may be seen by comparing FIG. 24 with FIG. 19 described above, FIG. 24 is the same as the process of the second embodiment shown in FIG. 19 except that the process shown in FIG. 24 is carried out in the base station and not the mobile station. In FIG. 24 those steps which are basically the same as those corresponding steps in FIG. 19 are designated by the same reference numerals, and a description thereof will be omitted.

The procedure for thereafter controlling the up transmission power based on the up reference reception level so as to converge to the optimum value is also the same as that described above in conjunction with FIG. 6, and a description thereof will be omitted for this embodiment.

Figure 25:
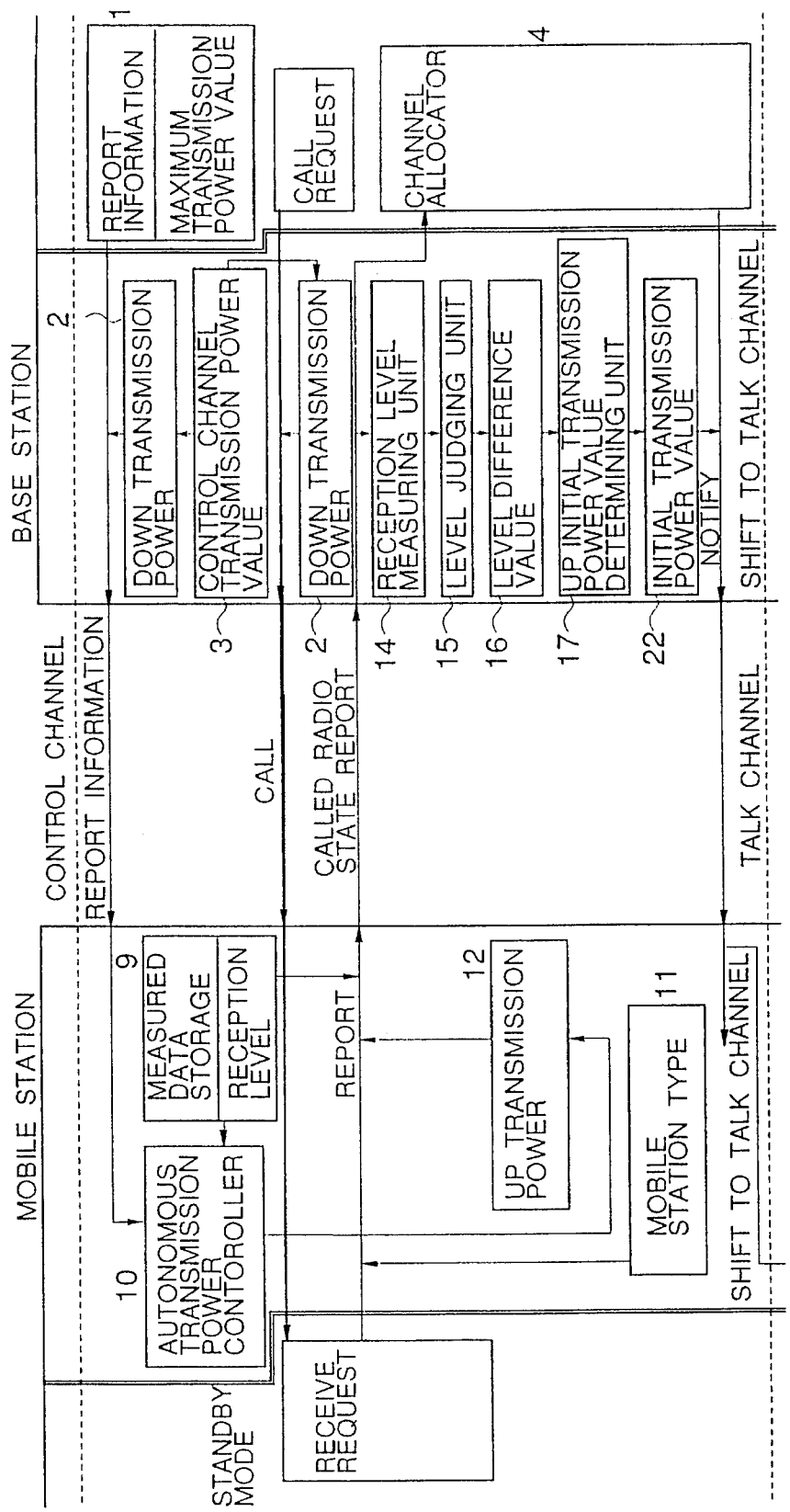
FIG. 25 is a diagram for explaining a control sequence of the up transmission power when the mobile station is called in the third embodiment.

FIG. 25 shows a control sequence of the up transmission power when the mobile station is called in the third embodiment. In this case, when a request to call the mobile station exists, the mobile station transmits the called radio state report having the format shown in FIG. 11. When the base station receives this called radio state report, the reception level measuring unit 14 measures the reception level. The level judging unit 15 compares the measured reception level with the threshold value which is used to determine the optimum up initial transmission power value, and obtains the level difference value 16 between the measured reception level and the threshold value. The up initial transmission power value determining unit 17 determines the initial transmission power value of the up talk channel based on the level difference value 16, and notifies the determined initial transmission power value 22 to the mobile station with the radio channel designation. The operation carried out thereafter is the same as that at the time of the calling.

Figure 26:
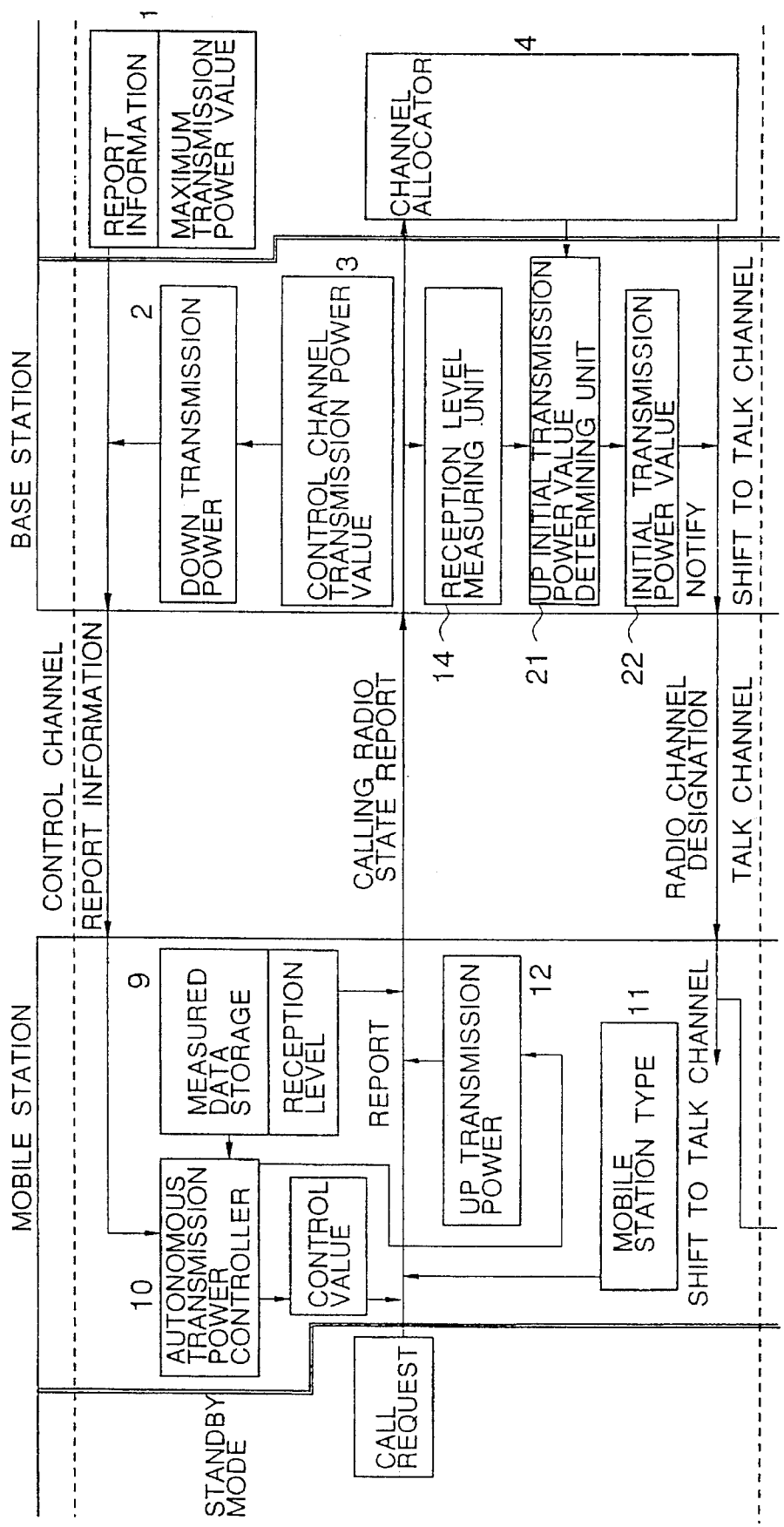
FIG. 26 is a diagram for explaining a control sequence of the up transmission power when the mobile station calls in a fourth embodiment of the present invention.

Next, a description will be given of a fourth embodiment of the method of determining the initial transmission power according to the present invention, by referring to FIG. 26. FIG. 26 shows a control sequence of the up transmission power when the mobile station calls in the fourth embodiment. Similarly to the third embodiment described above, this fourth embodiment also determines the up initial transmission power value at the base station, and the determined up initial transmission power value is notified to the mobile station. The mobile station determines the up transmission power 18 based on the notified up initial transmission power value.

In this embodiment, the procedure up to the point where the mobile station makes the calling radio state report with respect to the base station due to the call request generated at the mobile station, and the operation of allocating the channel by the channel allocator 4 when the base station receives the calling radio state report and making the radio channel designation to the mobile station based on the channel allocation, .are the same as those of the second and third embodiments described above. However, in this embodiment, the calling radio state report includes a control value 23 at the time when the transmission power is autonomously controlled by the autonomous transmission power controller 10 of the mobile station. This control value 23 indicates the amount by which the transmission power of the control channel is reduced from the maximum transmission power when transmitting the calling radio state report by taking as a reference the maximum transmission power (maximum transmission power reported by the report information 1) at which the output can be made, when the reception level of the own zone measured during the standby mode of the mobile station is greater than a predetermined threshold value. The control value 23 is reported by a bit pattern shown in FIG. 27 using a definition region peculiar to the operator within the format of the mobile station type shown in FIG. 9.

In this embodiment, the up transmission power control of the mobile station is carried out in the following manner. That is, when the base station receives the calling radio state report, the reception level measuring unit 14 measures the reception level of the calling radio state report. An initial transmission power value determining unit 21 compares the measured reception level with a threshold value which is used to determine the optimum up initial transmission power value, and judges the level difference between the measured reception level and the threshold value. A value which is obtained by correcting the transmission power determined by the reported mobile station type 11 and control value 23 by use of the level difference, is regarded as an initial transmission power value 22 which is dependent on the mobile station type. This initial transmission power value 22 is converted into a corresponding bit pattern as shown in FIG. 28, and the bit pattern is notified to the mobile station when making the radio channel designation. In FIG. 28, a symbol "*" indicates a reserve bit. In addition, an indication "3 W–8 dB/2 W–4 dB", for example, indicates that the 3 W mobile station has a transmission power of 3 W–8 dB and the 2 W mobile station has a transmission power of 2 W–4 dB. The mobile station which receives the above notification sets the up transmission power 18 to the initial transmission power value 22.

Figure 29:
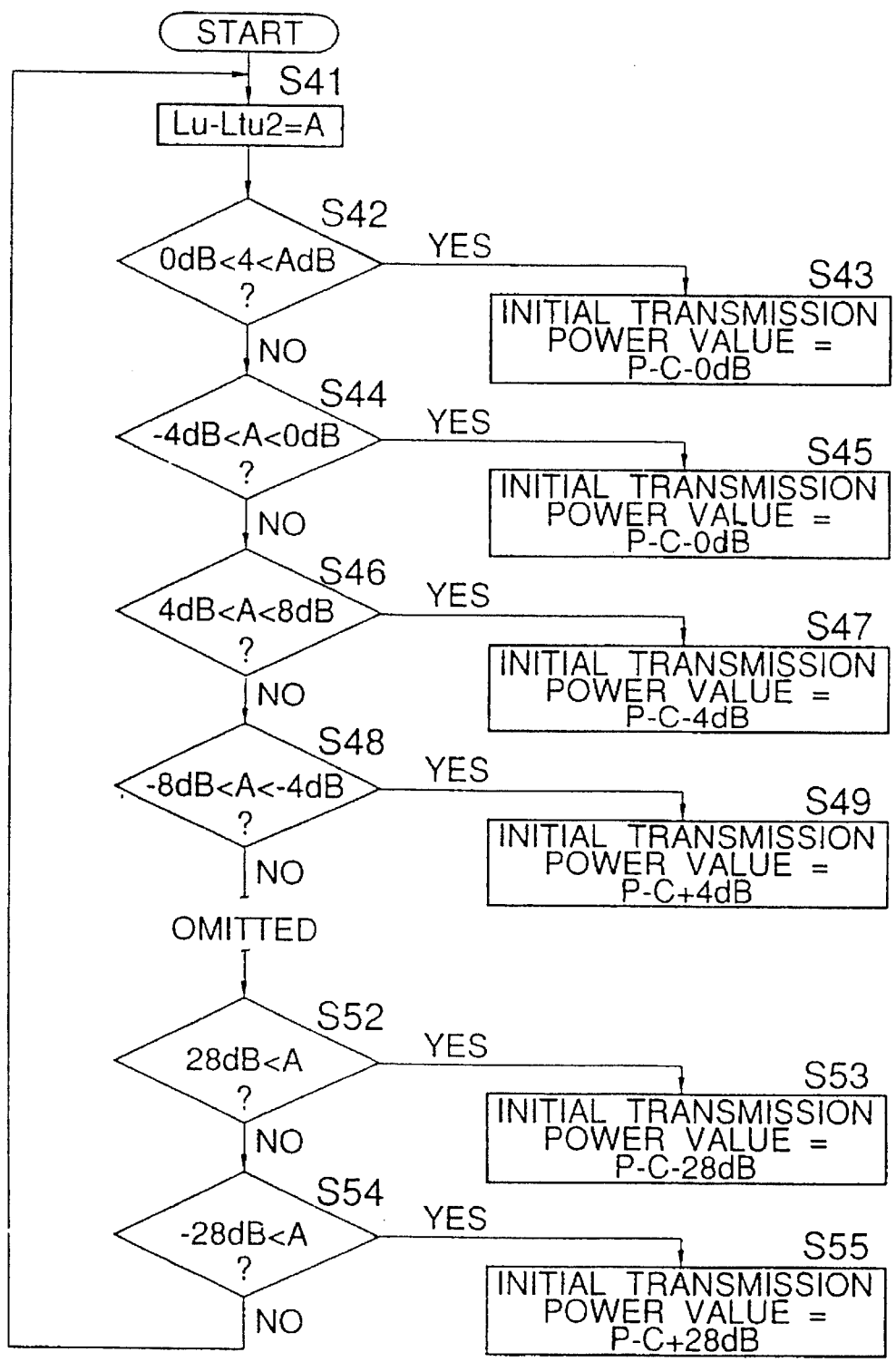
FIG. 29 is a flow chart for explaining a process of determining an up initial transmission power value in the fourth embodiment.

FIG. 29 is a flow chart for explaining the process of determining the up initial transmission power value in the fourth embodiment. In FIG. 29, Lu denotes the measured reception level, Ltu2 denotes the threshold value for controlling the up transmission power, P denotes the reported mobile station type (maximum transmission power that can be transmitted from the mobile station), and C denotes the autonomous transmission power control value.

In FIG. 29, a step S41 obtains a level difference A between the reception level Lu and the threshold value Ltu2 for controlling the up transmission power. A step S42 decides whether or not 0 dB<A<4 dB, and a step S43 sets the initial transmission power value to P–C–0 dB if the decision result in the step S42 is YES. If the decision result in the step S42 is NO, a step S44 decides whether or not –4 dB<A<0 dB, and a step S45 sets the initial transmission power value to P–C–0 dB if the decision result in the step S44 is YES. If the decision result in the step S44 is NO, a step S46 decides whether or not 4 dB<A<8 dB, and a step S47 sets the initial transmission power value to P–C–4 dB. If the decision result in the step S46 is NO, a step S48 decides whether or not –8 dB<A<–4 dB, and a step S49 sets the initial transmission power value to P–C+4 dB if the decision result in the step S48 is YES.

A step S52 decides whether or not 28 dB<A, and a step S53 sets the initial transmission power value to P–C–28 dB if the decision result in the step S52 is YES. If the decision result in the step S52 is NO, a step S54 decides whether or not –28 dB<A, and a step S55 sets the initial transmission power value to P–C+28 dB if the decision result in the step S54 is YES. The process returns to the step S41 if the decision result in the step S54 is NO.

In other words, if the reported mobile station type P(=number 11) is 3 W and the control value C(=number 23) is 4 dB, for example, the initial transmission power value 22 is set to a transmission power 8 dB lower than 3 W if the reception level Lu is higher than the threshold value Ltu2 by more than 4 dB and less than 8 dB.

Hence, for the following conditions shown on the left side, the initial transmission power value 22 is set as shown on the corresponding right side, although some of the conditions are omitted in FIG. 29 for the sake of convenience.

---

0 dB < A < 4 dB →
    Initial transmission power value =
    P – C – 0 dB
–4 dB < A < 0 dB →
    Initial transmission power value =
    P – C + 0 dB
4 dB < A < 8 dB →
    Initial transmission power value =
    P – C – 4 dB
–8 dB < A < –4 dB →
    Initial transmission power value =
    P – C + 4 dB
8 dB < A < 12 dB →
    Initial transmission power value =
    P – C – 8 dB
–12 dB < A < –8 dB →
    Initial transmission power value =
    P – C + 8 dB
12 dB < A < 16 dB →
    Initial transmission power value =
    P – C – 12 dB
–16 dB < A < –12 dB →
    Initial transmission power value =
    P – C + 12 dB
16 dB < A < 20 dB →
    Initial transmission power value =
    P – C – 16 dB
–20 dB < A < –16 dB →
    Initial transmission power value =
    P – C + 16 dB
20 dB < A < 24 dB →
    Initial transmission power value =
    P – C – 20 db
–24 dB < A < –20 dB →
    Initial transmission power value =
    P – C + 20 dB
24 dB < A < 28 dB →
    Initial transmission power value =
    P – C – 24 dB
–28 dB < A < –24 dB →
    Initial transmission power value =
    P – C + 24 dB
28 dB < A →
    Initial transmission power value =
    P – C – 28 dB
A < –28 dB →
    Initial transmission power value =
    P – C + 28 dB

---

The control procedure of the up transmission power carried out thereafter based on the up reference reception level so that a convergence is made to the optimum value, is the same as the control sequence of the up transmission power in the conventional case described above in conjunction with FIG. 6. Hence a description thereof will be omitted.

Figure 30:
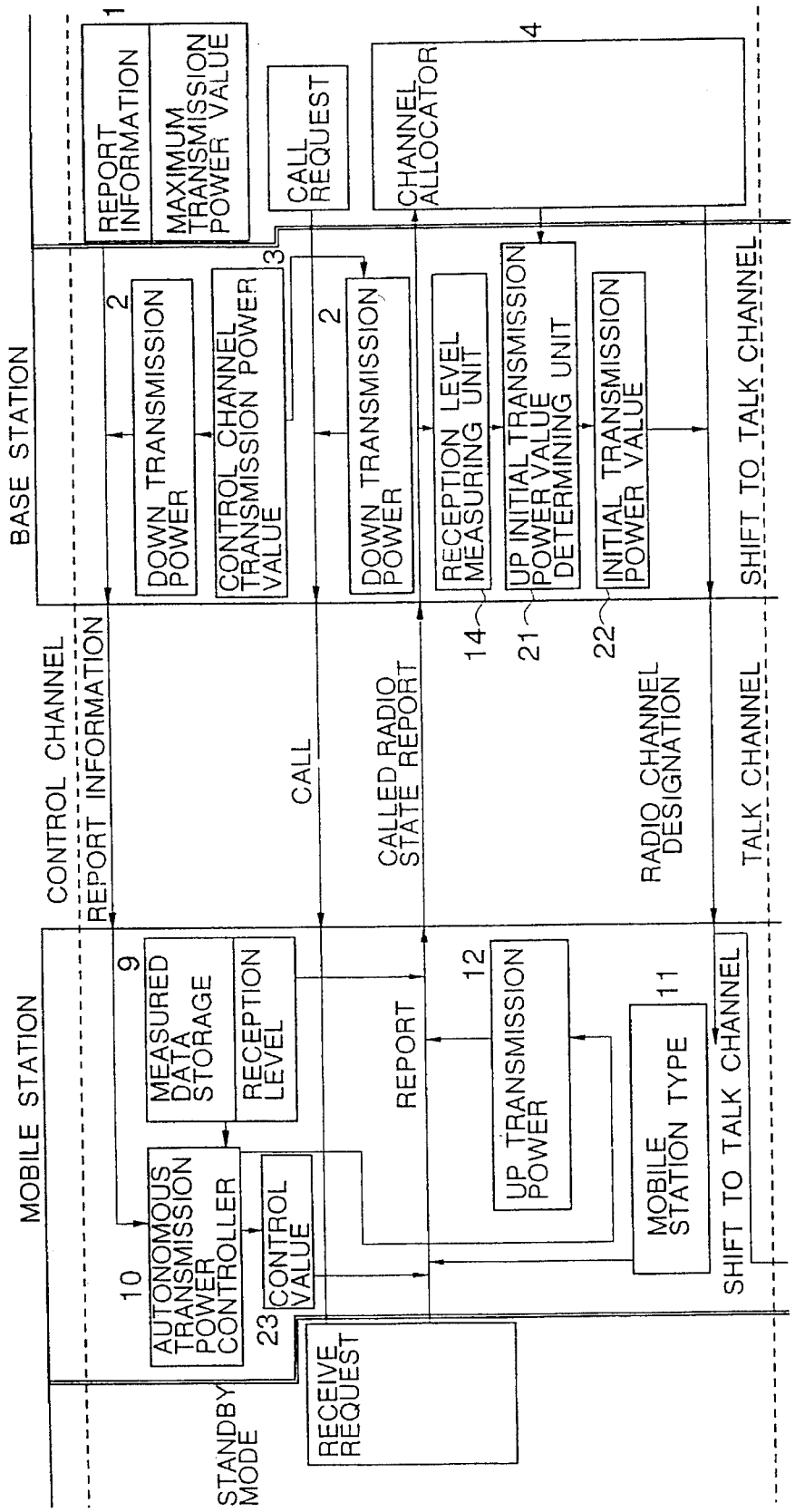
FIG. 30 is a diagram for explaining a control sequence of the up transmission power when the mobile station is called in the fourth embodiment.

FIG. 30 shows a control sequence of the up transmission power when the mobile station is called in the fourth embodiment. In this case, when a request to call the mobile station exists, the mobile station sends the called radio state report having the format shown in FIG. 11. When the base station receives this called radio state report, the reception level measuring unit 14 measures the reception level of the called radio state report. The up initial transmission power value determining unit 21 compares the measured reception level with the threshold value which is used to determine the optimum up initial transmission power value, and determines the initial transmission power value 22 from the level difference between the measured reception level and the threshold value. The initial transmission power value 22 is notified to the mobile station when making the radio channel designation. The operation carried out thereafter is the same as that at the time of making the call.

In the first embodiment, the base station receives the report of the down line reception level from the mobile station and determines the down initial transmission power value. However, when the mobile station measures the down line reception level, it is possible to also obtain the down initial transmission power value and report only this down initial transmission power value to the base station. In this case, the base station can determine the down transmission power based on the down initial transmission power value. In addition, it is also possible to report to the base station the level difference information related to the level difference between the reception level and the threshold value. In this case, the base station can determine the down transmission power based on the level difference information.

In the second embodiment, the base station obtains the level difference value from the up line reception level and notifies this level difference value to the mobile station. However, it is possible to instead notify to the mobile station an absolute value of the up line reception level. In this case, the mobile station can determine the up initial transmission power value based on this absolute value.

In the third and fourth embodiments, the base station determines the up initial transmission power value from the up line reception level, and this value is notified to the mobile station. However, it is possible to notify instead to the mobile station an absolute value of the up line reception level. In this case, the mobile station can determine the up initial transmission power value based on this absolute value.

Further, the present invention is not limited to these embodiments, but various variations and modifications may be made without departing from the scope of the present invention.

What is claimed is:

1. A method of determining an initial transmission power in a mobile communication system having a base station and at least one mobile station, a control channel leading from the base station to the mobile station and a talk channel leading from the base station to the mobile station, said method comprising the steps of:

(a) measuring, at the mobile station, a reception level of said control channel leading from the base station to the mobile station;

(b) obtaining a comparison result, at the mobile station, by comparing the measured reception level with a threshold value which is used to determine an initial transmission power value of said talk channel;

(c) determining, at the mobile station, the initial transmission power value of said talk channel based on the comparison result, and reporting the initial transmission power value of said talk channel to the base station; and (d) setting, at the base station, the initial transmission power value of said talk channel, reported from the mobile station.

2. A method of determining an initial transmission power in a mobile communication system having a base station and at least one mobile station, a control channel leading from the mobile station to the base station and a talk channel leading from the mobile station to the base station, said method comprising the steps of:

(a) reporting from the mobile station a transmission power value of said control channel to the base station;

(b) measuring, at the base station, a reception level of said control channel leading from the mobile station to the base station in response to the report made in said step (a);

(c) obtaining a comparison result, at the base station, by comparing the measured reception level with a threshold value which is used to determine an initial transmission power value of said talk channel;

(d) notifying from the base station to the mobile station, as the initial transmission power value of said talk channel, a value which is obtained by correcting a transmission power value of said control channel reported from the mobile station by the comparison result; and (e) setting, at the mobile station, the value notified by said step (d) as the initial transmission power value of said talk channel.

3. A method of determining an initial transmission power in a mobile communication system having a base station and at least one mobile station, a control channel leading from the mobile station to the base station and a talk channel leading from the mobile station to the base station, said method comprising the steps of:

(a) reporting from the mobile station to the base station, information about a mobile station type and a control value which is used for an autonomous transmission power control of a transmission power of said control channel;

(b) measuring, at the base station, a reception level of said control channel and obtaining a comparison result by comparing the measured reception level with a threshold value which is used to determine an initial transmission power value of said talk channel;

(c) notifying from the base station to the mobile station, as the initial transmission power value of said talk channel dependent on the mobile station type, a value which is obtained by correcting by the comparison result a transmission power value which is determined by said information about the mobile station type and the control value which are reported in said step (a); and (d) setting, at the mobile station, the value notified by said step (c) as the initial transmission power value of said talk channel.

4. A method according to claim 3, wherein said information is indicative of a maximum transmission power at which the mobile station can transmit signals.

5. A method of determining an initial transmission power in a mobile communication system having a base station and at least one mobile station, a control channel leading from the mobile station to the base station and a talk channel heading from the mobile station to the base station, said method comprising the steps of:

(a) measuring, at the base station, a reception level of said control channel leading from the mobile station to the base station, and notifying the measured reception level to the mobile station;

(b) obtaining a comparison result at the mobile station by comparing the measured reception level notified by said step (a) with a threshold value which is used to determine an initial transmission power value of said talk channel; and (c) setting, at the mobile station, as the initial transmission power value of said talk channel, a value which is obtained by correcting a transmission power value of said control channel by the comparison result.

6. A method of determining an initial transmission power in a mobile communication system having a base station and at least one mobile station, a control channel leading from the mobile station to the base station and a talk channel leading from the mobile station to the base station, said method comprising the steps of:

(a) measuring, at the base station, a reception level of said control channel leading from the mobile station to the base station, and notifying to the mobile station, a comparison result which is obtained by comparing the measured reception level with a threshold value which is used to determine an initial transmission power value of said talk channel; and (b) determining, at the mobile station, as the initial transmission power value of said talk channel, a value which is obtained by correcting by the comparison result notified by said step (a), a transmission power value which is determined by information about the mobile station type and a control value which is used for an autonomous transmission power control.

7. A method of determining an initial transmission power in a mobile communication system having a base station and at least one mobile station, a control channel leading from the mobile station to the base station and a talk channel leading from the mobile station to the base station, said method comprising the steps of:

(a) measuring, at the base station, a reception level of said control channel leading from the mobile station to the base station, and notifying the measured reception level to the mobile station;

(b) obtaining a comparison result, at the mobile station, by comparing the measured reception level notified by said step (a) with a threshold value which is used to determine an initial transmission power value of said talk channel; and (c) setting, at the mobile station, as the initial transmission power value of said talk channel, a value which is obtained by correcting by the comparison result a transmission power value which is determined by information about the mobile station type and a control value which is used for an autonomous transmission power control.

8. A method according to claim 7, wherein said information is indicative of a maximum transmission power at which the mobile station can transmit signals.

* * * * *